(12) United States Patent
Atay et al.

(10) Patent No.: US 9,531,889 B2
(45) Date of Patent: Dec. 27, 2016

(54) MEDIA STIFFNESS SENSOR ASSEMBLY FOR AN IMAGING DEVICE

(71) Applicant: Lexmark International, Inc., Lexington, KY (US)

(72) Inventors: Stefan Mark Atay, Lexington, KY (US); Timothy L Brown, Dayton, OH (US); Daniel Lee Carter, Georgetown, KY (US); Marc Alan Herwald, Lexington, KY (US); Niko Jay Murrell, Lexington, KY (US); Jeremy Keith Payne, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/145,601

(22) Filed: Dec. 31, 2013

(65) Prior Publication Data

US 2015/0296091 A1 Oct. 15, 2015

(51) Int. Cl.
*B65H 5/00* (2006.01)
*H04N 1/00* (2006.01)
*G06K 15/00* (2006.01)
*B65H 7/02* (2006.01)
(Continued)

(52) U.S. Cl.
CPC ............ *H04N 1/00092* (2013.01); *B65H 7/02* (2013.01); *G01G 1/00* (2013.01); *G03G 15/6591* (2013.01); *G06K 15/4065* (2013.01); *H04N 1/00031* (2013.01); *H04N 1/00037* (2013.01); *H04N 1/00063* (2013.01); *H04N 1/00074* (2013.01); *H04N 1/00665* (2013.01); *B65H 2301/51212* (2013.01); *B65H 2403/41* (2013.01); *B65H 2511/212* (2013.01); *B65H 2511/22* (2013.01); *B65H 2511/416* (2013.01); *B65H 2515/10* (2013.01); *B65H 2515/312* (2013.01); *B65H 2515/81* (2013.01); *B65H 2553/51* (2013.01); *B65H 2801/06* (2013.01); *G03G 2215/00447* (2013.01); *G03G 2215/00628* (2013.01); *G03G 2215/00738* (2013.01); *H04N 2201/0094* (2013.01)

(58) Field of Classification Search
CPC ............. B65H 9/04; B65H 7/02; B65H 43/00; B65H 2511/416; B65H 2515/312; B65H 2515/10
See application file for complete search history.

(56) References Cited

U.S. PATENT DOCUMENTS

| 5,962,861 | A | 10/1999 | Fowler |
| 6,247,861 | B1 * | 6/2001 | Wotton .................... B65H 7/16 400/627 |
| 6,701,098 | B2 | 3/2004 | Pyke |

(Continued)

*Primary Examiner* — Howard Sanders
(74) *Attorney, Agent, or Firm* — John Victor Pezdek

(57) ABSTRACT

A media stiffness sensor assembly for an imaging device. The assembly comprises a translation mechanism coupled to a contact member, a drive mechanism coupled to the translation mechanism and a position sensor for providing a signal indicative of the position of the contact member. The assembly is mounted within an imaging device so that the contact member is moved into bending contact with a cantilevered portion of a media sheet in the media path. The energy used to translate the contact member from a home position into the cantilevered portion of a media sheet in the media path to deflect the cantilevered portion is used to determine a weight of the media sheet.

21 Claims, 15 Drawing Sheets

(51) Int. Cl.
*G01G 1/00* (2006.01)
*G03G 15/00* (2006.01)

(56) References Cited

U.S. PATENT DOCUMENTS

2007/0036567 A1* 2/2007 Kawasaki .......... G03G 15/5029
399/45

* cited by examiner

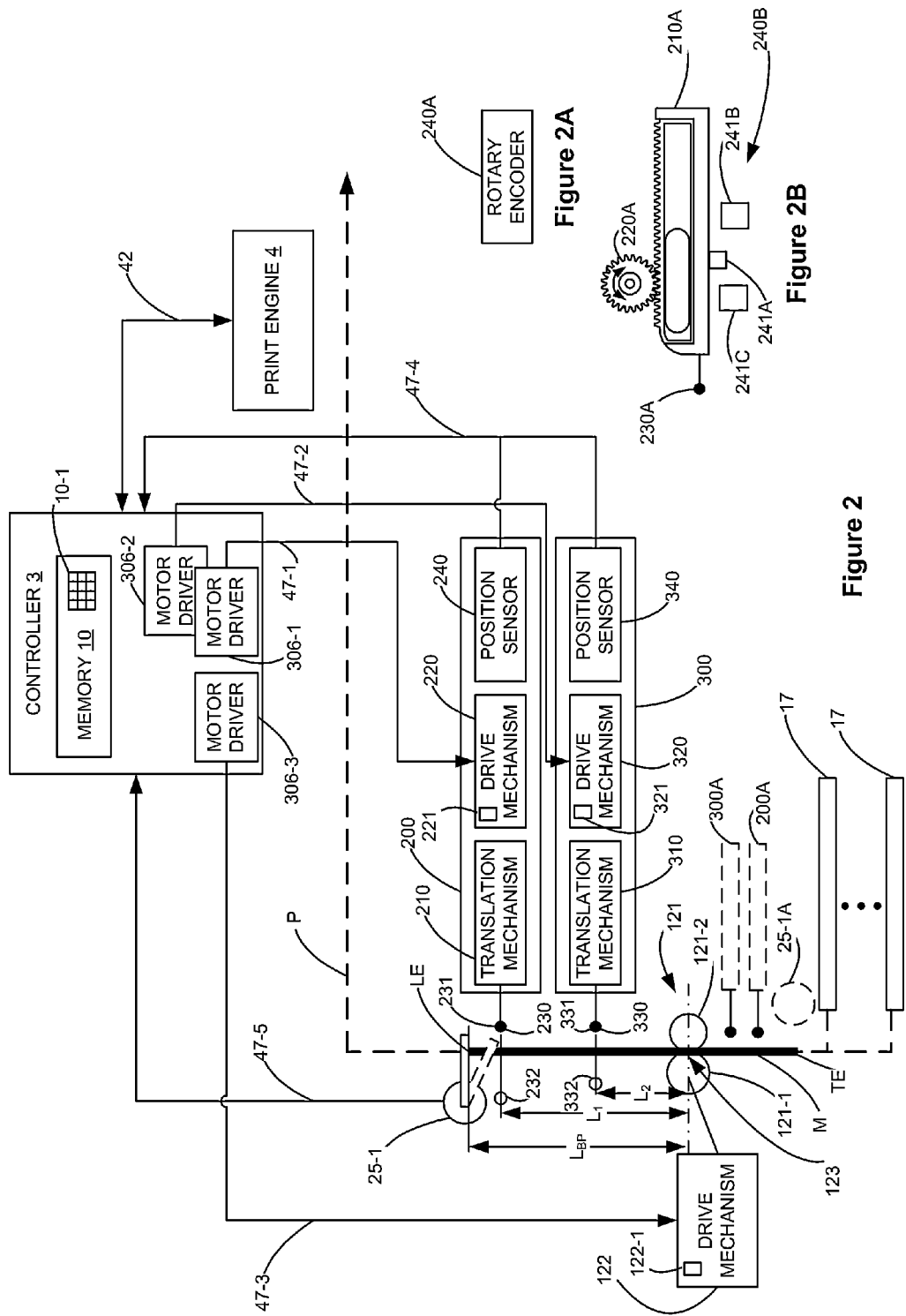

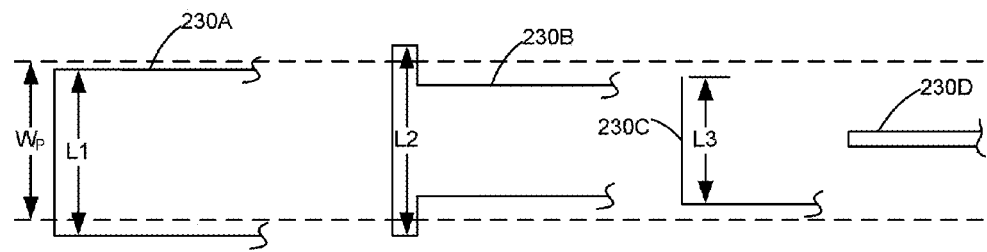
Figure 3A  Figure 3B  Figure 3C  Figure 3D
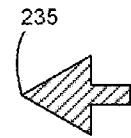 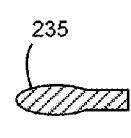 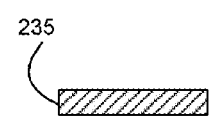
Figure 4A  Figure 4B  Figure 4C
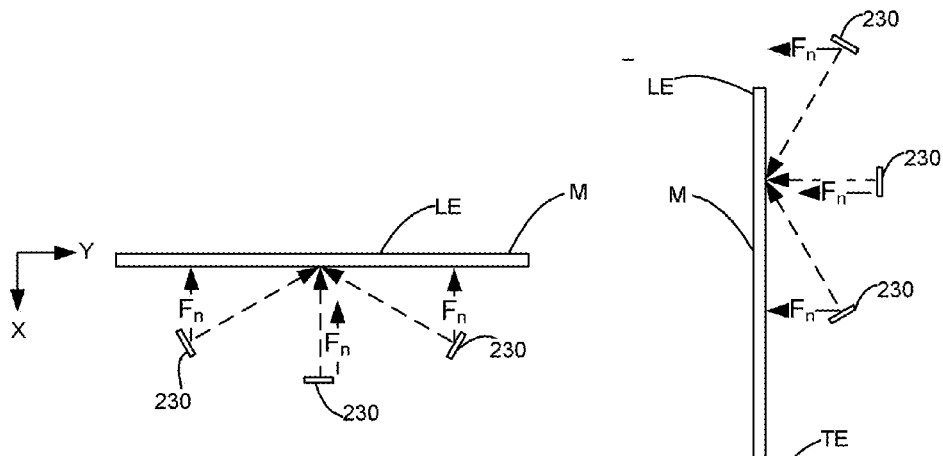
Figure 5A
Figure 5B
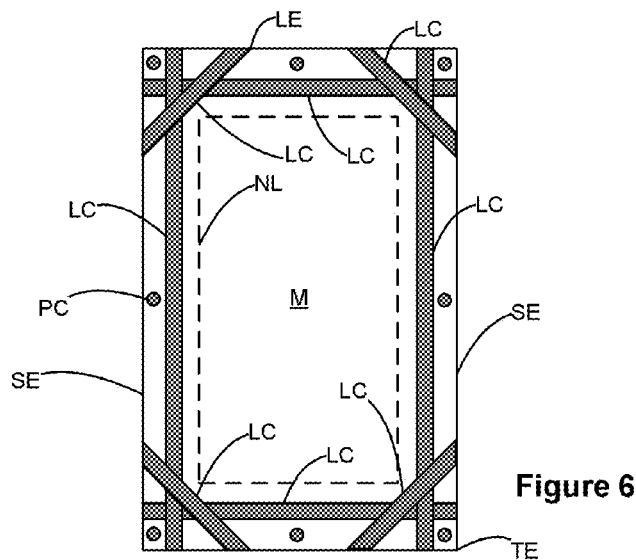
Figure 6

MEDIA STIFFNESS SENSOR ASSEMBLY FOR AN IMAGING DEVICE

CROSS REFERENCES TO RELATED APPLICATIONS

This patent application is related to U.S. patent application Ser. No. 14/145,661, filed Dec. 31, 2013, entitled "METHOD OF USING AN IMAGING DEVICE HAVING A MEDIA STIFFNESS SENSOR ASSEMBLY", issued Sep. 8, 2015 as U.S. Pat. No. 9,128,438, and assigned to the assignee of the present application.

STATEMENT REGARDING FEDERALLY SPONSORED RESEARCH OR DEVELOPMENT

None.

REFERENCE TO SEQUENTIAL LISTING, ETC

None.

BACKGROUND

Field of the Disclosure

The present disclosure relates generally to imaging device media sensors and methods of using the same, and more particularly to media stiffness sensors and methods of using the same.

Description of the Related Art

Currently, most imaging devices require user to input media type, weight, and texture. However, most users do not adjust media settings. Of those that do adjust settings, only a small percentage correctly classify media. Failure to correctly set media properties results in print quality defects, poor fuse grade, and higher jam rates. Also, this leads to a higher number of service calls, visits, and replacement part rates.

Incorrectly setting media weight is a major contributor to these higher failure rates. If the media weight is set too low, the printer runs too fast, transfer voltages are set too low, and fuser temperatures are set too low. If the media weight is set too high, the printer runs too slow, transfer voltages are set too high, and fuser temperatures are set too high. Poor print quality is a result along with premature hardware failures.

In particular, light weight media set at a normal or a heavy weight has a much higher likelihood to wrap a fuser, particularly, when printing higher coverage pages. Too much heat is provided and the toner hot offsets. Because the trend is towards using lighter weight media with more refined (recycled) fiber content, this problem will become more prevalent.

Additionally, heavy weight media set at normal or light weight does not adequately melt the toner and cold offset occurs. This allows unattached toner to deposit on the fuser backup roll and be carried downstream where it contaminates paper guides and creates catch points. This results in a higher likelihood for jams, fuser being wrapped by media (fuse wraps), and machine damage on subsequent jobs. Ultimately, if media is run at an improper weight setting, user satisfaction suffers.

A number of sensors that loosely correlate to stiffness or thickness are available. These include methods based upon wave/pulse transmission (optical, acoustic, microwave, etc.), visual thickness inspection (cameras mounted in a tray, etc.), and monitoring feed or pick motor current. Energy transmittance methods typically have difficulty distinguishing between very light and normal weight media; these methods also have broader standard deviations when the media is more porous, is dual-web, or has a watermark. Visual thickness inspection would require camera electronics and hardware to be placed in each media input and image processing algorithms would be needed to interpret the data captured. Feed motor and pick motor current signals are inherently noisy; the current is dependent upon sheet friction, bending stiffness, and the dynamic behavior of the sheet.

It would be desirable to have a sensor and method that avoids the aforementioned drawbacks and provides an automatic determination of a media weight of a sheet of media as it is being fed along a media feed path in an imaging device prior to being imaged. It would additionally be desirable to be able to adjust an operating parameter of the imaging device based on the selected media weight.

SUMMARY

Disclosed is a media stiffness sensor assembly for use in an imaging device to determine a media weight of a media sheet being fed along the media path of the imaging device. The media stiffness sensor assembly comprises a frame mountable in the imaging device; a translation mechanism translateably mounted to the frame; a contact member connected to the translation mechanism and translateable between a home position and a travel distance, a drive mechanism, and a position sensor for determining the position of the contact member. The contact member is positioned so as to provide a normal force component to a plane of a media sheet in media path of the imaging device when the frame is mounted in the imaging device. The drive mechanism is operably connected to the translation mechanism to effect translation of the contact member and is operably connectable to a controller in the imaging device. The position sensor provides an output signal indicating the position of the contact member during the translation and is operably connectable to the controller.

The drive mechanism, in one form, includes a reversible motor in operable communication with the controller. Rotation of the motor in a first direction translates the contact member from the home position thereof and rotation of the motor in a second direction opposite the first direction translates the contact member toward the home position. The position sensor, in one form, is an encoder operably coupled to a drive shaft of the motor and in operable communication with the controller. The encoder provides the signal for indicating the position of the contact member. The translation mechanism includes a translation member translateably mounted to a frame within the imaging device. The translation member has a rack portion. The drive mechanism includes a rack gear. The rack gear is operably coupled to the motor, rotatably mounted to the frame, and engaged with the rack portion of the translation member.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

FIG. 2 is a schematic illustration of a system utilizing the presently disclosed sensor assembly according to one example embodiment.

FIGS. 2A-2B illustrate various position sensor configurations for the sensor assembly of FIG. 2.

FIGS. 3A-3D illustrate various examples of contact member configurations for use in a stiffness sensor assembly.

FIGS. 4A-4C illustrate various contact member cross-sectional shapes.

FIGS. 5A-5B illustrate various approach angles of the contact member with respect to the plane of the media sheet.

FIG. 6 illustrates various contact regions on a media sheet that may be used when measuring media stiffness.

FIG. 7A depicts staging of a media sheet; FIG. 7B depicts the bending of the media sheet by the media stiffness sensor assembly and FIG. 7C depicts the exiting of the media sheet from the system upon completion of a measurement cycle.

FIG. 8 illustrates the motor power of both lighter and heavier weight media classes while FIG. 9 uses an expanded Y-axis scale to better distinguish the motor power needed for stiffness measurements of lighter weight media shown in FIG. 8.

DETAILED DESCRIPTION

Figure 1:
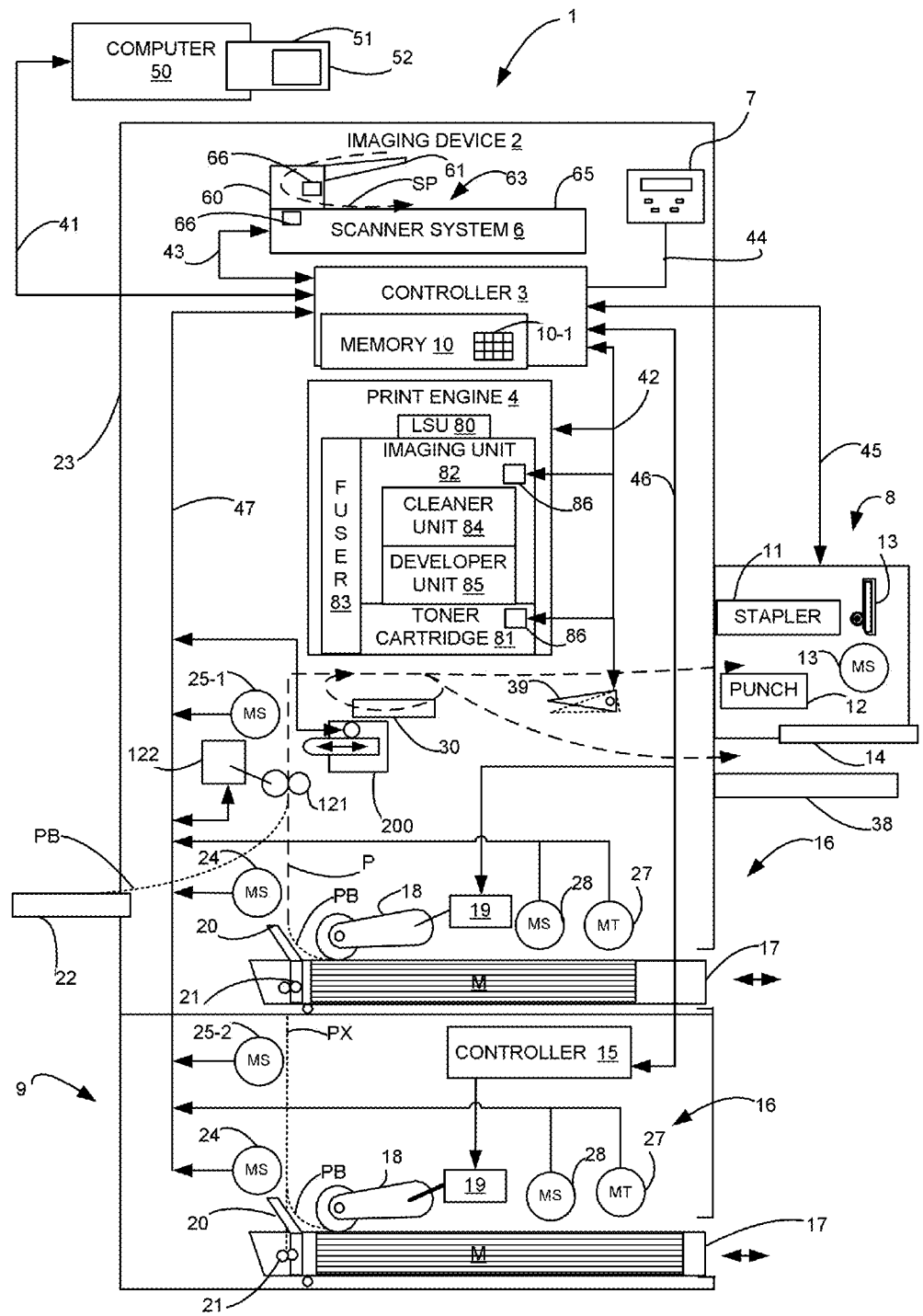
FIG. 1 is a schematic illustration of an imaging system including an imaging device.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open-ended terms that indicate the presence of stated elements or features, but do not preclude additional elements or features. The articles "a", "an", and "the" are intended to include the plural as well as the singular, unless the context clearly indicates otherwise. The use of "including," "comprising," or "having" and variations thereof herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

It will be further understood that each block of the diagrams, and combinations of blocks in the diagrams, respectively, may be implemented by computer program instructions. These computer program instructions may be loaded onto a general purpose computer, special purpose computer, processor, or other programmable data processing apparatus to produce a machine, such that the instructions which execute on the computer or other programmable data processing apparatus may create means for implementing the functionality of each block or combinations of blocks in the diagrams discussed in detail in the descriptions below. These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the function specified in the block or blocks. Computer readable storage medium includes, for example, disks, CD-ROMS, Flash ROMS, nonvolatile ROM and RAM. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions may be displayed in a user interface or computer display of the computer or other programmable apparatus that implements the functions or the computer program instructions.

The term "output" as used herein encompasses output from any printing device such as color and black-and-white copiers, color and black-and-white printers, and multifunction devices that incorporate multiple functions such as scanning, copying, and printing capabilities in one device. Such printing devices may utilize ink jet, dot matrix, dye sublimation, laser, and any other suitable print formats. The term "button" as used herein means any component, whether a physical component or graphic user interface icon, that is engaged to initiate an action or event.

The term "image" as used herein encompasses any printed or electronic form of text, graphics, or a combination thereof. "Media" or "media sheet" refers to a material that receives a printed image or, with a document to be scanned, a material containing a printed image. The media is said to move along the media path and the media path extensions from an upstream location to a downstream location as it moves from the media trays to the output area of the imaging device. For a top feed option tray, the top of the option tray is downstream from the bottom of the option tray. Conversely, for a bottom feed option tray the top of the option tray is upstream from the bottom of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. As used herein, the term "media width" refers to the dimension of the media that is transverse to the direction of the media path. The term "media length" refers to the dimension of the media that is aligned to the direction of the media path. "Media process direction" describes the movement of media within the imaging system as is generally meant to be from an input toward an output of the imaging system 1. Further relative positional terms may be used herein. For example, "superior" means that an element is above another element. Conversely "inferior" means that an element is below or beneath another element Media is conveyed using pairs of aligned rolls forming feed nips. The term "nip" is used in the conventional sense to refer to the opening formed between two rolls that are located at about the same point in the media path. The rolls forming the nip may be separated apart, be tangent to each other, or form an interference fit with one another. With this nip type, the axes of the rolls are parallel to one another and are typically, but do not have to be, transverse to the media path. For example, a deskewing nip may be at an acute angle to the media feed path. The term "separated nip" refers to a nip formed between two rolls that are located at different points along the media path and have no common point of tangency with the media path. Again the axes of rotation of the rolls having a separated nip are parallel but are offset from one another along the media path. Nip gap refers to the space between two rolls. Nip gaps may be positive, where there is an opening between the two rolls, zero where the two rolls are tangentially touching or negative where there is an interference fit between the two rolls.

As used herein, the term "communication link" is used to generally refer to a structure that facilitates electronic communication between multiple components. While several communication links are shown, it is understood that a single communication link may serve the same functions as the multiple communication links that are illustrated. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Devices interconnected by a communication link may use a standard communication protocol, such as for example, universal serial bus (USB), Ethernet or IEEE 802.xx, or other communication protocols.

Referring now to the drawings and particularly to FIG. 1, there is shown a diagrammatic depiction of an imaging system 1. As shown, imaging system 1 may include an imaging device 2, and an optional computer 50 attached to the imaging device 2. Imaging system 1 may be, for example, a customer imaging system, or alternatively, a development tool used in imaging apparatus design. Imaging device 2 is shown as a multifunction machine that includes a controller 3, a print engine 4, a scanner system 6, a user interface 7, a finisher 8 and/or one or more option assemblies 9.

Controller 3 includes a processor unit and associated memory 10, and may be formed as one or more Application Specific Integrated Circuits (ASICs). Memory 10 may be any volatile or non-volatile memory or combination thereof such as, for example, random access memory (RAM), read only memory (ROM), flash memory and/or non-volatile RAM (NVRAM). Alternatively, memory 10 may be in the form of a separate electronic memory (e.g., RAM, ROM, and/or NVRAM), a hard drive, a CD or DVD drive, or any memory device convenient for use with controller 3. Scanner system 6 may employ scanning technology as is known in the art including for example, CCD scanners, optical reduction scanners or combinations of these and other scanner types. Finisher 8 may include a stapler 11, a punch 12, one or more media sensors 13, various media reference and alignment surfaces and an output area 14 for holding finished media. Imaging device 2 may also be configured to be a printer without scanning.

In FIG. 1, controller 3 is illustrated as being communicatively coupled with computer 50 via communication link 41. Controller 3 is illustrated as being communicatively coupled with print engine 4, scanner system 6, user interface 7, and finisher 8, including stapler 11, punch 12 and sensors 13, via communication links 42, 43, 44, 45, respectively. Computer 50 includes in its memory 51 a software program including program instructions that function as an imaging driver 52, e.g., printer/scanner driver software, for imaging device 2. Imaging driver 52 is in communication with controller 3 of imaging device 2 via communication link 41. Imaging driver 52 facilitates communication between imaging device 2 and computer 50. One aspect of imaging driver 52 may be, for example, to provide formatted print data to imaging device 2, and more particularly to print engine 4, to print an image. Another aspect of imaging driver 52 may be, for example, to facilitate collection of scanned data from scanner system 6.

In some circumstances, it may be desirable to operate imaging device 2 in a standalone mode. In the standalone mode, imaging device 2 is capable of functioning without computer 50. Accordingly, all or a portion of imaging driver 52, or a similar driver, may be located in controller 3 of imaging device 2 so as to accommodate printing and/or scanning functionality when operating in the standalone mode.

Print engine 4, scanner system 6, user interface 7 and finisher 8 may include firmware maintained in memory 10 which may be performed by controller 3 or another processing element. Controller 3 may be, for example, a combined printer, scanner and finisher controller. Controller 3 serves to process print data and to operate print engine 4 and toner cartridge 81 during printing, as well as to operate scanner system 6 and process data obtained via scanner system 6 for printing or transfer to computer 50. Controller 3 may provide to computer 50 and/or to user interface 7 status indications and messages regarding the media, including scanned media and media to be printed, imaging device 2 itself or any of its subsystems, consumables status, etc. Computer 50 may provide operating commands to imaging device 2. Computer 50 may be located nearby imaging device 2 or be remotely connected to imaging device 2 via an internal or external computer network. Imaging device 2 may also be communicatively coupled to other imaging devices.

Scanner system 6 is illustrated as having an automatic document feeder (ADF) 60 having a media input tray 61 and a media output area 63. Two scan bars 66 may be provided—in ADF 60 and the other in the base 65—to allow for scanning both surfaces of the media sheet as it is fed from input tray 61 along scan path SP to output area 63.

Print engine 4 is illustrated as including laser scan unit (LSU) 80, a toner cartridge 81, an imaging unit 82, and a fuser 83, all mounted within imaging device 2. Imaging unit 82 and toner cartridge 81 are supported in their operating positions so that toner cartridge 81 is operatively mated to imaging unit 82 while minimizing any unbalanced loading forces by the toner cartridge 81 on imaging unit 82. Imaging unit 82 is removably mounted within imaging device 2 and includes a developer unit 85 that houses a toner sump and a toner delivery system. The toner delivery system includes a toner adder roll that provides toner from the toner sump to a developer roll. A doctor blade provides a metered uniform layer of toner on the surface of the developer roll. Imaging unit 82 also includes a cleaner unit 84 that houses a photoconductive drum and a waste toner removal system. Toner cartridge 81 is also removably mounted in imaging device 2 in a mating relationship with developer unit 85 of imaging unit 82. An exit port on toner cartridge 81 communicates with an entrance port on developer unit 85 allowing toner to be periodically transferred from toner cartridge 81 to resupply the toner sump in developer unit 85. Both imaging unit 82 and toner cartridge 81 may be replaceable items for imaging device 2. Imaging unit 82 and toner cartridge 81 may each have a memory device 86 mounted thereon for providing component authentication and information such as type of unit, capacity, toner type, toner loading, pages printed, etc. Memory device 86 is illustrated as being operatively coupled to controller 3 via communication link 42.

The electrophotographic imaging process is well known in the art and, therefore, will be briefly described. During an imaging operation, laser scan unit 80 creates a latent image by discharging portions of the charged surface of photoconductive drum in cleaner unit 84. Toner is transferred from the toner sump in developer unit 85 to the latent image on the photoconductive drum by the developer roll to create a toned image. The toned image is then transferred either directly to a media sheet received in imaging unit 82 from one of media input trays 17 or to an intermediate transfer member and then to a media sheet. Next, the toned image is fused to the media sheet in fuser 83 and sent to an output location 38, finisher 8 or a duplexer 30. One or more gates 39, illustrated as being in operable communication with controller 3 via communication link 42, are used to direct the media sheet to output location 38, finisher 8 or duplexer 30. Toner remnants are removed from the photoconductive drum by the waste toner removal system housed within cleaner unit 84. As toner is depleted from developer unit 85, toner is transferred from toner cartridge 81 into developer unit 85. Controller 3 provides for the coordination of these activities including media movement occurring during the imaging process.

While print engine 4 is illustrated as being an electrophotographic printer, those skilled in the art will recognize that print engine 4 may be, for example, an ink jet printer and one or more ink cartridges or ink tanks or a thermal transfer printer; other printer mechanisms and associated image forming material.

Controller 3 also communicates with a controller 15 in option assembly 9, via communication link 46, provided within each option assembly 9 that is provided in imaging device 2. Controller 15 operates various motors housed within option assembly 9 that position media for feeding, feed media from media path branches PB into media path P or media path extensions PX as well as feed media along media path extensions PX. Controllers 3, 15 control the feeding of media along media path P and control the travel of media along media path P and media path extensions PX.

Imaging device 2 and option assembly 9 each also include a media feed system 16 having a removable media input tray 17 for holding media M to be printed or scanned, and a pick mechanism 18, a drive mechanism 19 positioned adjacent removable media input trays 17. Each media tray 17 also has a media dam assembly 20 and a feed roll assembly 21. In imaging device 2, pick mechanism 18 is mechanically coupled to drive mechanism 19 that is controlled by controller 3 via communication link 46. In option assembly 9, pick mechanism 18 is mechanically coupled to drive mechanism 19 that is controlled by controller 3 via controller 15 and communication link 46. In both imaging device 2 and option assembly 9, pick mechanisms 18 are illustrated in a position to drive a topmost media sheet from the media stack M into media dam 20 which directs the picked sheet into media path P or extension PX. Bottom fed media trays may also be used. As is known, media dam 20 may or may not contain one or more separator rolls and/or separator strips used to prevent shingled feeding of media from media stack M. Feed roll assemblies 21, comprised of two opposed rolls feed media from an inferior unit to a superior unit via a slot provided therein.

In imaging device 2, a media path P (shown in dashed line) is provided from removable media input tray 17 extending through print engine 4 to output area 38, or when needed to finisher 8 or to duplexer 30. Media path P may also have extensions PX and/or branches PB (shown in dotted line) from or to other removable media input trays as described herein such as that shown in option assembly 9. Media path P may include a multipurpose input tray 22 provided on housing 23 of imaging device 2 or incorporated into removable media tray 17 provided in housing 23 and corresponding path branch PB that merges with the media path P within imaging device 2. Along media path P and its extensions PX are provided media position sensors 24, 25-1, 25-2 which are used to detect the position of the media, usually the leading and trailing edges of the media, as it moves along the media path P or path extension PX. Media position sensor 24 is located adjacent to the point at which media is picked from each of media trays 17 while media position sensors 25-1, 25-2 are positioned further downstream from their respective media tray 17 along media path P or path extension PX. Media position sensor 25-1 also accommodates media fed along path branch PB from multipurpose media tray 22 and is illustrated at a position downstream of feed roll pair 121. Media position sensor 25-2 is illustrated at a position on path extension PX downstream of media tray 17 in option assembly 9. Additional media position sensors may be located throughout media path P and a duplex path, when provided, and their positioning is a matter of design choice. Media position sensors 24, 25-1, 25-2 may be an optical interrupter or a limit switch or other type of edge detector as is known to a person of skill in the art and detect the leading and trailing edges of each sheet of media as it travels along the media path P, path branch PB or path extension PX.

Media type sensors 27 are provided in imaging device 2 and each option assembly 9 to sense the type of media being fed from removable media input trays 17. Media type sensor 27 may include a light source, such as an LED and two photoreceptors. One photoreceptor is aligned with the angle of reflection of the light rays from the LED to receive specular light reflected from the surface of the sheet of media and produces an output signal related to amount of specular light reflected. The other photoreceptor is positioned off of the angle of reflection to receive diffuse light reflected from the surface of the media and produces an output related to the amount of diffused light received. Controller 3, by ratioing the output signals of the two photoreceptors at each media type sensor 27, can determine the type of media in the respective media tray 17.

Media size sensors 28 are provided in image forming device 2 and each option assembly 9 to sense the size of media being feed from removable media input trays 17. To determine media sizes such as Letter, A4, A6, Legal, etc., media size sensors 28 detect the location of adjustable trailing edge media supports and one or both adjustable media side edge media supports provided within removable media input trays 17 as is known in the art. Sensors 24, 25-1, 25-2, 27, and 28 are shown in communication with controller 3 via communication link 47.

Also shown on media path P upstream of and adjacent to media position sensor 25-1 is media feed roll pair 121 driven by a drive mechanism 122. Positioned downstream of media feed roll pair 121 is a media stiffness sensor assembly 200. Drive mechanism 122 and media stiffness sensor assembly 200 are in communication with controller 3 via communication link 47. Sensor assembly 200 may also be located upstream of feed roll pair 121.

Referring to FIG. 2, the structure and operation of media stiffness sensor 200 within imaging device 2 will be described. In FIG. 2, drive mechanism 122 is illustrated as being operatively coupled to feed roll 121-1 while feed roll 121-2 is an idler roll. Feed roll pair 121 forms feed nip 123. Media stiffness sensor assembly 200 is illustrated at a position downstream of feed nip 123 a predetermined length $L_1$. Media position sensor 25-1 is illustrated at a position downstream of media stiffness sensor assembly 200 a predetermined length $L_{BP}$ from feed nip 123 that is greater than length $L_1$. An additional sensor assembly is also illustrated, media stiffness sensor assembly 300, at a position between sensor assembly 200 and feed nip 123 a predetermined length $L_2$. Because both sensor assemblies 200, 300 are similar, discussion of the construction and operation of only sensor assembly 200 will be described with noted exceptions where the construction or operation of sensor assembly 300 may differ.

Media sheet M, having leading and trailing edges LE, TE, is shown having being fed from one of media input trays 17 and through feed nip 123. The leading edge LE of media sheet M is shown as having actuated media position sensor 25-1. The leading edge LE of media sheet M is illustrated as being downstream of media stiffness sensor assembly 200. Print engine 4 is downstream of feed nip 123 and in operative communication with controller 3 via communication link 42.

Media stiffness sensor assembly 200 comprises a translation mechanism 210 that is operatively coupled to a drive mechanism 220 including a DC motor 221. A contact member 230 is coupled to translation mechanism 210. A position sensor 240 is operatively coupled to provide the position of translation mechanism 210. Media stiffness sensor assembly 300 includes a translation mechanism 310, a drive mechanism 320 with motor 321, a contact member 330 coupled to translation mechanism 310 and a position sensor 340.

Drive mechanisms 220, 320 are in operative communication with controller 3 via communication links 47-1, 47-2, respectively, and position sensors 240, 340 via communication link 47-4. Drive mechanism 122 is in operative communication with controller 3 via communication link 47-3 while media position sensor 25-1 is in operative communication with controller 3 via communication link 47-5. A motor driver 306 may also be provided in controller 3 to energize motors used in drive mechanisms 122, 220 and 320. As shown motor drivers 306-1, 306-2 and 306-3 respectively drive motors 221, 321 and 122-1 in drive mechanisms 220, 320 and 122. Motor driver 306 may also be configured to measure the current being used by the motors in the drive mechanisms and to provide a pulse width modulated drive signal.

When driven by drive mechanism 220, translation mechanism 210 moves contact member 230 between a home position 231 through a travel distance indicated at 232, indicated by an empty circle. Position sensor 240 determines when contact member 230 is at the home position 231 thereof and when at the travel distance 232. Position sensor 240 may be a rotary encoder, such as rotary encoder 240A shown in FIG. 2A that provides a signal indicative of the position of contact member 230. Rotary encoder 240A may further be a quadrature-type encoder that provides a signal representative of both distance and direction. Rotary encoder 240A may be operatively connected to drive mechanism 220 or to translation mechanism 210 via a gear train. In a further form, position sensor 240 may be implemented as shown in FIG. 2B where position sensor 240B comprises a flag 241A affixed to translation mechanism 210A and a pair of spaced apart position sensors 241B, 241C indicating the home position and travel distance of contact member 230A. Translation mechanism 210A is shown being driven by drive mechanism 220A and is illustrated in a position between the home position 231 and the travel distance 232. Position sensors 241B, 241C operate in a manner similar to that of position sensors 24, 25-1, 25-2 previously described. The type of position sensor used to implement position sensor 220 is a matter of design choice and should not be considered to be a limitation of media stiffness sensor assembly 200.

It will be appreciated that media stiffness sensor assemblies may also be located upstream of feed nip 123 at a position between feed nip 123 and the trailing edge TE of media sheet M as indicated by dashed blocks 200A and 300A which correspond to media stiffness sensor assemblies 200, 300 respectively, and operate in substantially similar fashion except that the trailing portion of media sheet M is used in the stiffness measurement. A trailing edge position sensor, such as sensor 25-1A shown in a dashed circle, may be provided to indicate the location of the trailing edge TE or the location of the trailing edge TE of media sheet M may be inferred based on the position of the leading edge LE and the media length information provided by the media size sensors 28. The media position sensor, its placement with respect to feed nip 123 and the method of determining edge location of media sheet M should not be considered to be a limitation of the present assemblies or methods.

Contact member 230 may have several configurations and cross-sectional shapes. In FIG. 3A contact member 230A as being a bar shown extending partially across the media path width $W_P$ and is in a slightly offset position with respect to the width of media path P that is indicated by the set of dashed parallel lines. In FIG. 3A contact member 230A has a length L1 that can be greater than media path width $W_P$ but due to it being offset extends across only a portion of media path width $W_P$. As shown there contact member 230A has a generally C-shaped form. In FIG. 3B contact member 230B is again shown in a bar configuration that has a length L2 that is greater than the media path width $W_P$ and has a generally T-shaped form. In FIG. 3C, contact member 230C, again shown as a bar, is configured in an L-shape with a leg thereof having a length L3 that extends partially across the media path width $W_P$, contact member 230C may be positioned within the media path width $W_P$ or offset as shown for contact member 230A. The length of contact member 230 when configured as a bar may be chosen such that it will span the majority of each width of each of the various media types that may be provided in media input trays 17 and fed through feed roll pair 121, however shorter and longer lengths may be used than those illustrated. Contact members shown in FIGS. 3A-3C may also be referred to as line contacts or line contact members. FIG. 3D illustrates a further configuration of contact member 230 termed a point contact. There contact member 230D is a rod, a free end of which is moved into contact with media sheet M.

Shown in FIGS. 4A-4C are configurations for the contact face of contact member 230. The contact face 235 is that portion of the contact member 230 that is moved into media sheet M to apply a bending force thereto. In either the line-type or point-type configuration for contact member 230, contact face 235, may be pointed, rounded, or flat as shown in FIGS. 4A-4C, respectively.

The positioning of contact member 230 with respect to the plane of the media sheet is not limiting. Contact member 230 only needs to be positioned with respect the media path P or the plane of the media sheet (which is into the plane of the page in FIG. 2) such that when it is moved into contact with media sheet M, contact member 230 provides a force component $F_n$ that is normal to the surface of the media sheet M sufficient to bend media sheet M. Movement of the contact member 230 so that it provides a force component $F_n$ that is normal to the surface of the media sheet M sufficient to bend media sheet M is meant to be encompassed by the terms "translation", "translates" and "translating" and variants thereof as used in this specification. In other words, contact member 230 may approach at an angle with respect to the plane of the media sheet M. This is illustrated in FIGS. 5A-5B. In FIG. 5A contact member 230 is illustrated as approaching along the X-axis into the plane of the media sheet which lies along the Y-axis at three different acute approach angles, one being perpendicular and the outer two illustrated at opposite acute angles with respect to media sheet M. Of course other acute angles may be used. In FIG. 5B, contact member 230 is illustrated as approaching along the X-axis into the plane of the media sheet which lies along the Z-axis at three different acute approach angles, the center one being perpendicular and the outer two shown at opposite acute angles with respect to media sheet M. Again other acute angles may be used.

FIG. 6 illustrates operative contact regions, indicated by the grayed bars LC for line contacts and circles PC for point contacts, between contact member 230 and the plane of the media sheet M. It should be noted that the contact regions occur in cantilevered portions of the media sheet. The dashed rectangle NL illustrates possible locations of nip lines for forming the cantilevered portions of the media sheet M. The line contact regions LC may extend across the width of the media sheet M near the leading and trailing edges LE, TE, along either of the side edges SE, across the corner areas of media sheet M and at various points about the periphery of media sheet M. The locations shown for point contact areas PC circles are illustrative only and not meant to limit point contacts to only the illustrated areas. It will be appreciated that the contact regions, LC, PC would be positioned with respect to an edge of the media sheet M such that the media edge will not slip past the contact member when the contact member is at the travel distance.

Figure 7A:
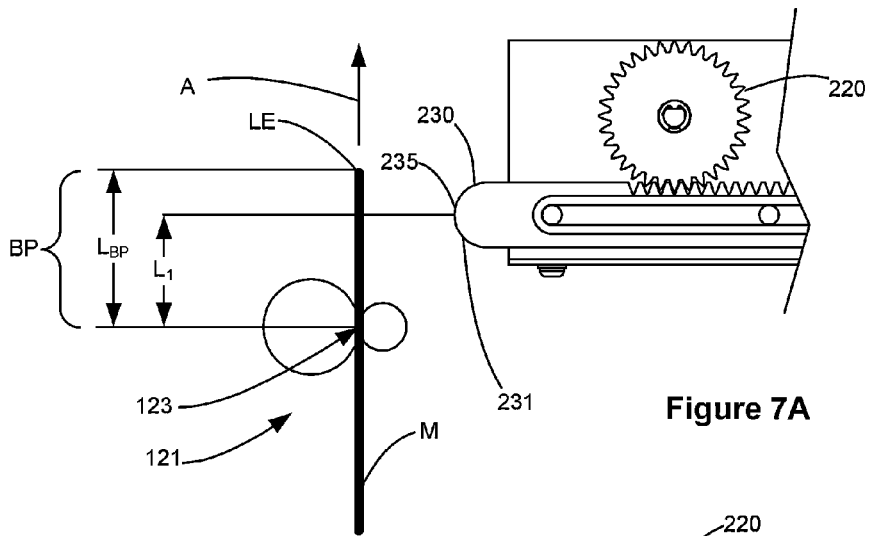
FIGS. 7A-7C illustrate a measurement cycle using the system of FIG. 2 where
Figure 7B:
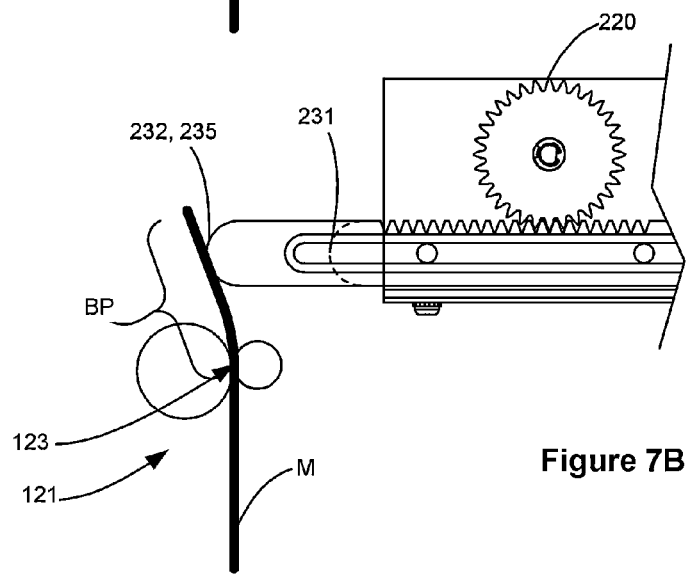
Figure 7C:
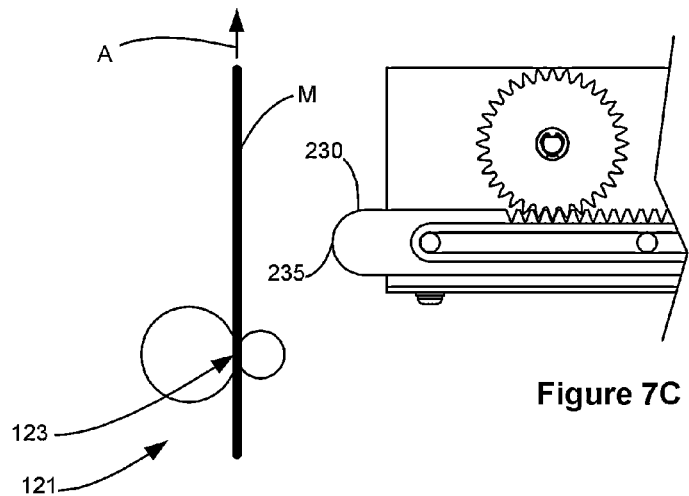

FIGS. 7A-7C illustrate a measurement cycle for stiffness sensor assembly 200. Media process direction is indicated by arrow A. In FIG. 7A, the leading edge LE of media sheet M has been detected by position sensor 25-1 (not shown for purposes of clarity) and media sheet M is staged for measurement. A portion of media sheet M is cantilevered from feed nip 123 of feed roll pair 121 forming a beam portion BP having length $L_{BP}$. It will be appreciated that the cantilever portion BP of media sheet M may be formed by devices other than feed roll pair 121. For example, clamping bars may be provided along the media path P to hold media sheet M so that a portion thereof is cantilevered. Also a cantilever portion of media sheet may also be formed along a side edge as indicated by the contact regions shown in FIG. 6.

Contact member 230 is in its home position 231 and positioned intermediate the leading edge LE and feed nip 123 at a length $L_1$. In one form, length $L_1$ is in the range of about 5 mm to about 50 mm and length $L_{BP}$ is in a corresponding range of about 10 mm to about 100 mm. In FIG. 7B, contact face 235 of contact member 230 has been moved into the plane of media sheet M (which as illustrated is perpendicular to the plane of the page), has reached the travel distance 232 and has deflected or bent beam portion BP of media sheet M. At the travel distance 232, the deflected portion BP of media sheet M has stored energy. The deflected portion BP of media sheet M may be modeled as a cantilevered beam of a length $L_1$ with contact member 230 applying a force thereto to create a bending moment. The amount of travel energy used by stiffness sensor assembly 200 to reach the travel distance 232 and to bend the portion of media sheet M of length LB 1 is determined. This energy amount may be correlated to the stiffness or thickness of media sheet M.

In FIG. 7C, contact member 230 has been retracted to its home position 231 with beam portion BP releasing its stored energy back into contact member 230 as it unbends. The amount of return energy used by stiffness sensor assembly 200 to return to its home position 231 is determined. The media sheet M is then fed in the media process direction indicated by arrow A. The energy provided by beam portion BP helps in returning contact member 230 to its home position 231. In another embodiment the difference between the travel energy and return energy may be correlated to media thickness or stiffness. For example, the difference between the travel energy and the return energy is used to determine a weight of the media sheet M.

Referring back to FIG. 2, contact member 330 is in its home position 331 and positioned intermediate contact member 230 and feed nip 123 at a length $L_2$ from feed nip 123 that is less than length $L_1$. In one form length $L_2$ is in the range of about 2 mm to about 15 mm By providing a shorter measurement length on the portion BP of the media undergoing bending, stiffness measurements of lighter weight media made by media stiffness sensor assembly 300 are more separable than would be possible with the longer measurement length present when using sensor assembly 200 to make the measurements.

Figure 8:
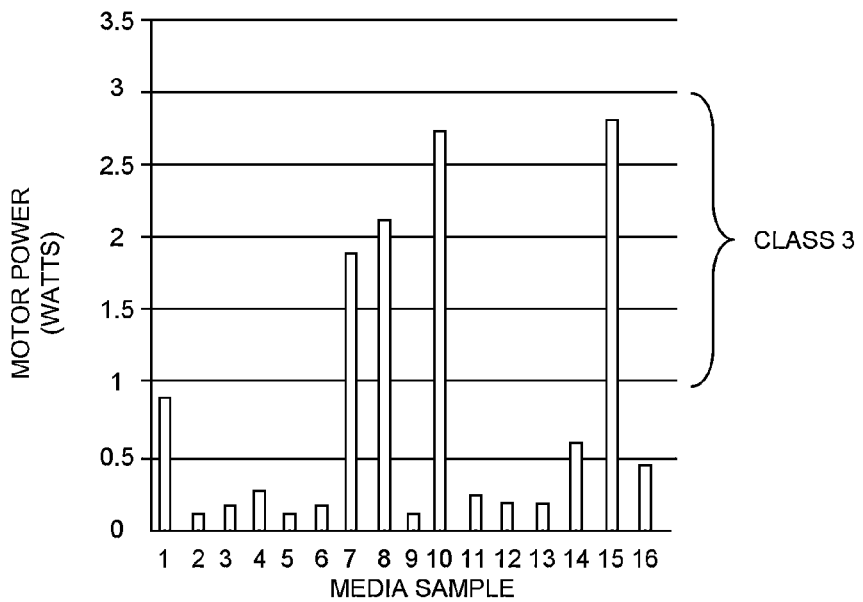
FIGS. 8-9 illustrate the relationship between motor power used in bending cycles for stiffness measurement of various media weight classes with three classes indicated where
Figure 9:
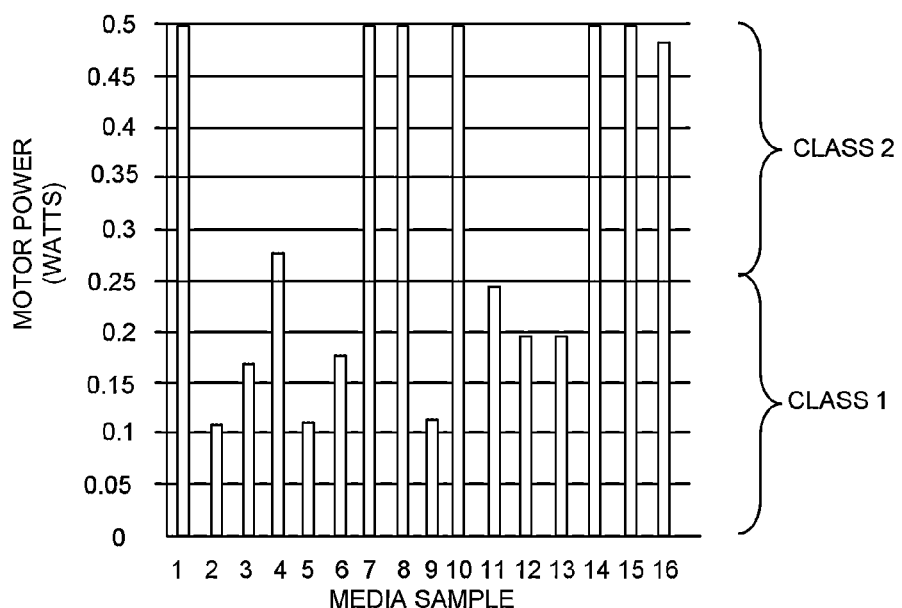
Figure 14:
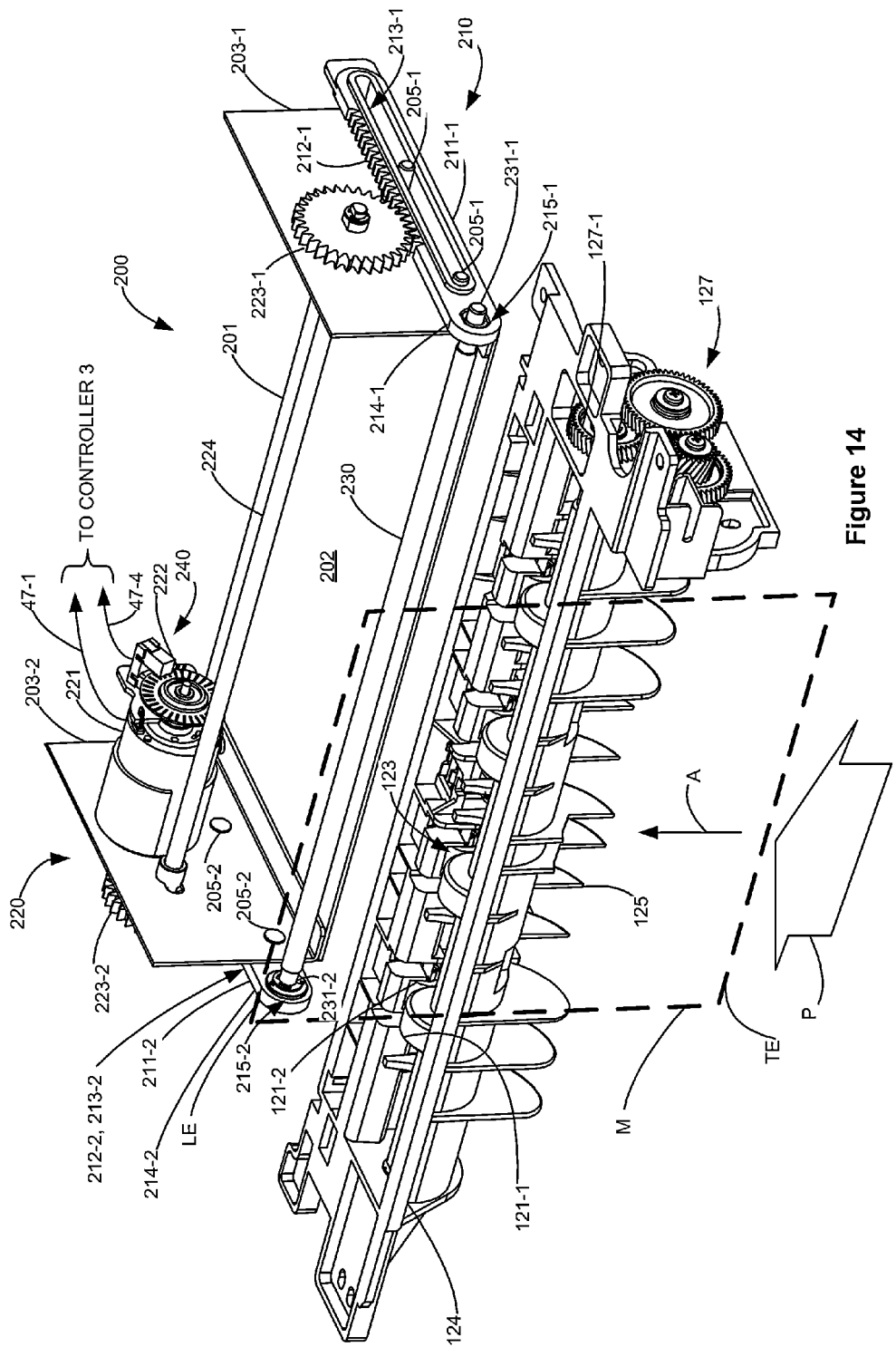
FIG. 14 is one example embodiment of the presently disclosed stiffness sensor assembly.

Referring to the data illustrated FIGS. 8-9, the data in FIG. 8 was obtained using the length $L_1$ of sensor assembly 200 while that in FIG. 9 was obtained using the shorter length $L_2$ of sensor assembly 300, both assemblies 200, 300 being configured as shown in FIG. 14. Common media types were tested having basis weights ranging in a continuum from about 45 grams/meter$^2$ to about 500 grams/meter$^2$, or, using another metric, having thicknesses ranging in a continuum from about 2 mils to about 12 mils. Sixteen various media types were tested. Media samples 1-16 are, respectively: business envelopes; sixteen pound paper; twenty-four pound cotton paper; twenty-eight pound glossy paper; sixteen pound recycled paper; twenty-four pound smooth paper; seven mil synthetic media; paper labels; sub-sixteen pound office paper; ninety pound cardstock; twenty-four pound bond paper; twenty pound office paper; transparency media; vinyl labels; sixty pound cardstock; and thirty-two pound office paper. The motor power which correlates to media stiffness is shown for these sixteen different types of media. As shown media samples 1, 7, 8, 10, and 15 the range of their motor power values is significantly larger than the range of motor power values for the remaining media samples. The higher motor power values correlates to these media types having a greater stiffness than the other samples. This allows these five media types to be more easily discerned from one another. However, the range in motor power values between media samples 2-6, 9 and 11-14 and 16 is significantly less than the range of motor power values for media samples 1, 7, 8, 10 and 15 and, at the scale used in FIG. 15, harder to discern from one another. By using sensor assembly 300 where the shorter length $L_2$ is used, the scale for the range of motor power has been expanded between the values of 0 and 0.5 so that, as shown in FIG. 9, the differences between samples 2-6, 9, and 11-14 and 16 may be more readily detected. FIGS. 8-9 also illustrate three possible media weight classes, class 1 being media requiring having a motor power value higher than 1.0, class 2 being media requiring a motor power value between 0.5 and 1.0 and class 3 being media requiring a motor power between 0 and 0.5. The classes and the range of values within each class may be stored in a look-up table 10-1 in memory 10 (see FIG. 2).

Figure 10:
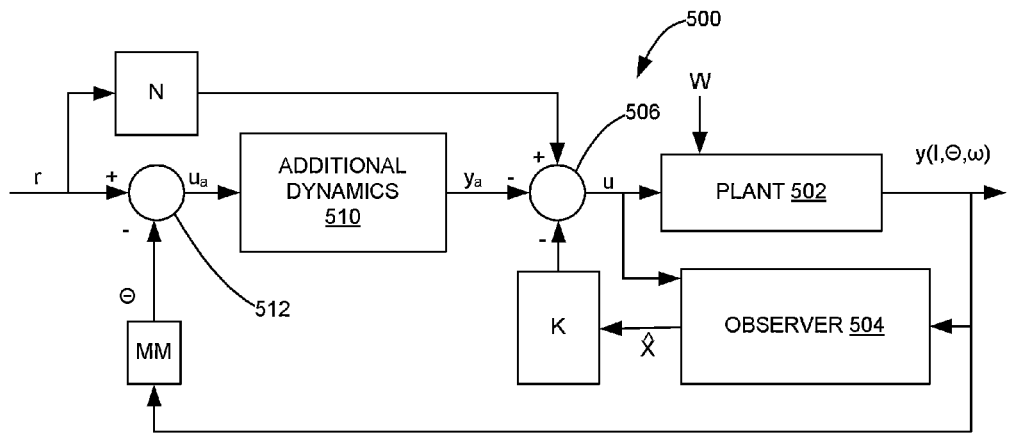
FIG. 10 is a block diagram of closed loop control system for a drive mechanism.
Figure 11:
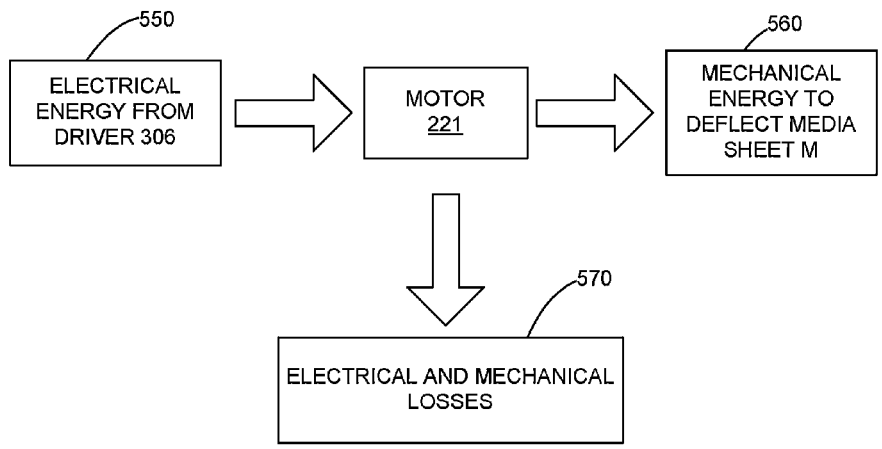
FIGS. 11-12 respectively illustrate the energy balance of the sensor assembly when translating to the travel distance and returning to the home position.
Figure 12:
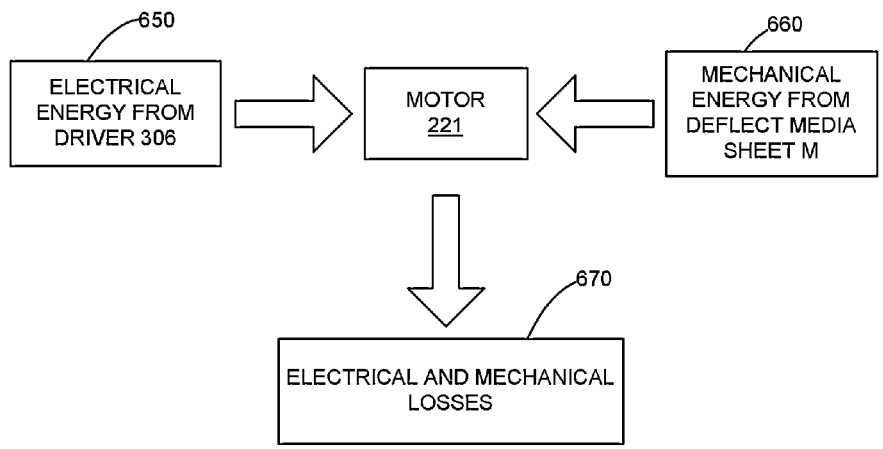

Referring now to FIGS. 10-12, the operating principles of the stiffness sensor assembly 200 will be described. Where the operation of stiffness sensor assembly 300 differs from that of sensor assembly 200 it will be noted. As previously described drive mechanism 200 contains a brushed DC motor 221 with an attached quadrature encoder 240 used to measure absolute angular position and speed. As is known in the art, motor driver 306, which may be an H-bridge motor driver, is used to energize motor 221. Motor driver 306 also measures the electrical current in the motor during a Pulse Width Modulated (PWM) on-time.

Shown in FIG. 10 is a block diagram of one form of a closed loop control system 500 that may be used to control the position of motor 221. The position and speed measured from the encoder 240 and motor current may be both used as feedback signals in control system 500, this is indicated by the signal y representing these three feedback signals which are outputted from plant 502. The signal y may be comprised of one of motor current I; motor current I and motor speed ω; motor current I and motor position θ; and motor current I, motor speed ω and motor position θ. The plant 502 represents the mathematical model of the motor 221 where u is the applied voltage, W is an unknown torque applied to the motor shaft and signal y is the output. The observer 504 in a feedback loop around plant 502 has the applied voltage u, and signal y as inputs and generates filtered estimated signals of the motor states—position, speed and current—which are collectively represented by signal x-hat that is fed back to node 506 through K which is a matrix of feedback gains for each of the respective estimated signals. The signal r is the commanded position for motor 221 which in turn positions contact member 230. Signal r may vary with time and is fed to node 512 and to feed-forward gain N the output of which is provided to node 506. Node 512 also receives as input the angular position signal θ. The angular position signal θ is extracted from signal y using matrix multiplier MM that is outputted from plant 502 and fed to multiple MM to remove motor current and motor speed signals if present in signal y. The output of node 512 is the position error of the mechanism (r minus θ), designated as signal $u_a$, and, is the input to additional dynamics 510. Additional dynamics 510 contains a mathematical model of the commanded position signal, r, such that the steady-state position error of the control system will asymptotically approach zero and provides an output signal $y_a$ to node 506. The output of node 506 is the applied voltage signal u. The control algorithm may be executed at a rate of 1 kHz.

The commanded position profile is pi radians of a sine wave. The additional dynamics 510 may be designed such that the control system 500 can track a sine wave of known frequency with zero steady-state error, or simply track a step input. Although the sine-tracking dynamics yielded the smallest error, both designs yield sufficiently small steady-state error. The step-tracking dynamics were found to yield higher stability margins.

The metric used to estimate bending stiffness of the media sheet M was derived from the electrical energy input to the motor 221. The voltage (which is calculated based on the PWM duty cycle) and the current (which is measured) are multiplied together to yield an estimate of the instantaneous power input to the motor 221 every time the control algorithm executes (every millisecond). This power value is integrated to produce an estimate of the total energy input to the motor 221.

FIG. 11 represents the energy balance as the contact member 230 is extended. During the first half of a measurement cycle when contact member is translated into media sheet M and through travel distance and media sheet M is deflected, energy from the driver 306, block 550, is delivered into the motor 221 and either generates mechanical energy or motion to deflect media sheet M, block 560, or is wasted through mechanical and electrical losses, block 570. The energy that generates motion to deflect media sheet M ultimately is stored as potential energy in the media sheet M, which is a function of the page stiffness.

FIG. 12 represents the energy balance when contact member 230 is retracted to its home position 231. During retraction, energy from the driver 306, block 650 is delivered to the motor 221 and generates motion to retract the contact member 230. All of this energy is unrecoverable and goes towards mechanical and electrical losses, block 670. The potential energy that was stored in the deflect media sheet M, block 660, is now delivered back to the motor 221 as mechanical energy. As a result, the energy input required from the driver 306 will be less than it was when deflecting the media sheet M. Specifically, the energy stored in the deflect media sheet M will work to reduce the overall load on the motor 221, which will require less current to be drawn from the driver 306, which also results in fewer electrical losses. At some points during the retraction it is even possible for energy to be delivered back to the driver 306.

Figure 13:
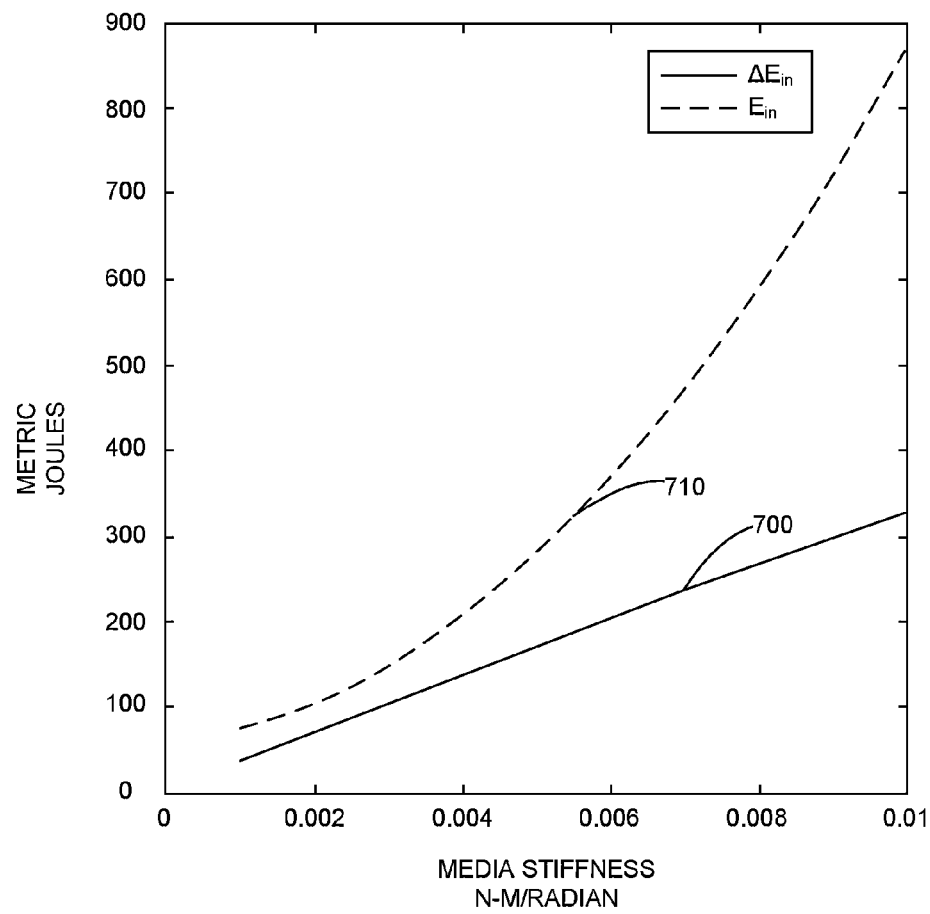
FIG. 13 is a graph showing two curves, one showing the linear relationship of media stiffness to the difference between travel energy and return energy during a measurement cycle and the other showing the nonlinear relationship between stiffness and total energy input during a measurement cycle.

The total electrical energy input $E_{in}$, to the motor 221 over the entire measurement cycle can be expressed as set forth in Equation 1:

$$E_{in} = 2U + W_{loss,e} + W_{loss,r} + E_{loss,e} + E_{loss,r} \quad \text{Eq. 1}$$

where U is the potential energy stored in the deflected page, $W_{loss,e}$ and $W_{loss,r}$ $E_{loss,e}$ are the mechanical losses during the extension (e) and retraction (r) of contact member 230, respectively, and $E_{loss,e}$ and $E_{loss,r}$ are the electrical losses during the extension and retraction of contact member 230, respectively. The electrical energy difference between engaging and retracting the mechanism can be expressed as set forth in Equation 2:

$$\Delta E_{in} = 2U + \Delta E_{loss} + \Delta W_{loss} \quad \text{Eq. 2}$$

where $\Delta E_{in}$ is the change of energy input $\Delta E_{loss}$ and $\Delta W_{loss}$ are the changes in electrical and mechanical losses during the measurement cycle. Either $E_{in}$ or $\Delta E_{in}$ may be used as the metric to correlate to media stiffness. However, $\Delta E_{in}$ metric has more linear relationship to the media stiffness, as seen in the simulation data shown in FIG. 13 where the solid straight line 700 represents the approximately linear relationship between $\Delta E_{in}$ and media stiffness and the dashed curved line 710 represents the non-linear relationship between $E_{in}$ and media stiffness.

Referring now FIG. 14, a more detailed illustration of media stiffness assembly 200 is illustrated. As both media stiffness assemblies 200, 300 are substantially the same except for their position in relation to the location of feed nip 123 only stiffness assembly 200 will be described. Frame 201 of sensor assembly 200 is mounted within imaging device 2 transverse to media path P, indicated by the wide arrow in FIG. 14 and consequently transverse to media sheet M shown in phantom line. Frame 201 includes a base 202 on which are mounted spaced apart, opposed legs 203-1, 203-2, that are illustrated as extending vertically upward. Translation mechanism 210 and drive mechanism 220 are mounted to frame 201. Translation mechanism 210 comprises a translation member, illustrated as first and second translation members 211-1, 211-2 that are substantially the same in structure. Provided on each translation member is a rack portion and guide slot, shown as rack portion 212-1 and guide slot 213-1 on translation member 211-1 and rack portion 212-2 and guide slot 213-2 on translation member 211-2 which are obscured by leg 203-2 on frame 201. A pair of guide pins is mounted to each leg, shown as pairs 205-1 and 205-2 mounted to legs 203-1 and 203-2, respectively, and is received into respective guide slots 213-1, 213-2. Guide pins 205-1, 205-2 guide and support translation members 211-1, 211-2 during translation. Adjacent first ends 214-1, 214-2 of translations members 211-1, 211-2, respectively, are aligned openings 215-1, 215-2 which receive respective ends 231-1, 231-2 of contact member 230, which here is illustrated as being a rod or cylinder. While two translation members 211-1, 211-2 are illustrated, a single translation member may be used and be operatively coupled to motor 221.

Mounted on frame 201 is drive mechanism 220 comprising a DC motor 221, a rack gear 223, illustrated as being rack gears 223-1, 223-2, axle 224. Rack gears 223-1 and 223-2 are mounted to axle 224 that is rotatably mounted to legs 203-1, 203-2. Rack gears 223-1, 223-2 operatively engage with respective rack portions 212-1, 212-2 and with motor 221 via a motor drive shaft mounted pinion gear obscured by leg 203-2. Motor 221 is shown mounted on leg 203-2 but may be mounted on leg 203-1 or mounted elsewhere in imaging device 2. Drive shaft 222 of motor 221 engages with rack gear 223-2 to provide torque for rotating rack gears 223-1, 223-2 and axle 224. Rotation of motor 221 in a first direction translates contact member 230 away from its home position 231 through travel distance 232 and rotation of motor 221 in a second direction opposite the first direction, translates contact member back to its home position 231. Position sensor 240, illustrated as being a quadrature encoder 240, is operatively coupled to drive shaft 222. Motor 221 and encoder 240 are communicatively coupled to controller 3 via communication links 47-4, 47-3, respectively.

Figure 15:
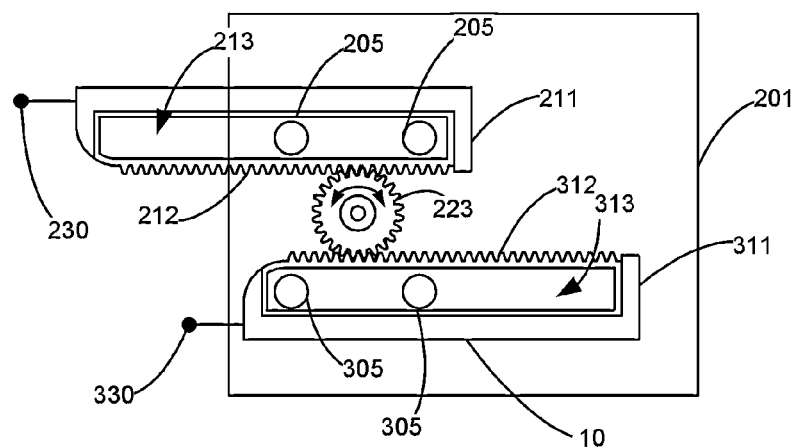
FIG. 15 is another example embodiment of the presently disclosed stiffness sensor assembly utilizing a dual contact member arrangement with a single drive motor.

FIG. 15 illustrates a further construction of sensor assemblies 200, 300 that are operated using a single drive mechanism. As shown translation members 211, 311 of drive assemblies 200, 300, respectively are slidably mounted to frame 201 on guide pin pairs 205, 305, respectively. Contacts members 230, 330 are schematically depicted mounted to translation members 211, 311, respectively. Translation members 211, 311 are mounted in a spaced, aligned relationship such that their respective rack portions 212, 312 are opposed. Mounted therebetween is rack gear 223 that is driven by motor 221. Rack gear 223 is operably engaged with the rack portions 212, 312. Rotation of rack gear 223 in the first direction will translate contact member 230 away from its home position while simultaneously translating contact member 330 toward its home position. Rotating rack gear 223 in the second direction reverses the respective translation directions of contact members 230, 330.

While a reversible motor is illustrated being used with drive mechanisms 220, 320, drive mechanisms 220, 320 may also use a single direction motor in combination to move contact members 230, 330 through travel distances 232, 332, respectively, while using a spring attached between each translation mechanism 210, 310 and frame 201 to return the respective contact members to their respective home positions when the single direction motor is deenergized. As a person of ordinary skill in the art would recognize, the design of the translation mechanism 210 and drive mechanism 220 should not be considered as limiting.

Figure 16:
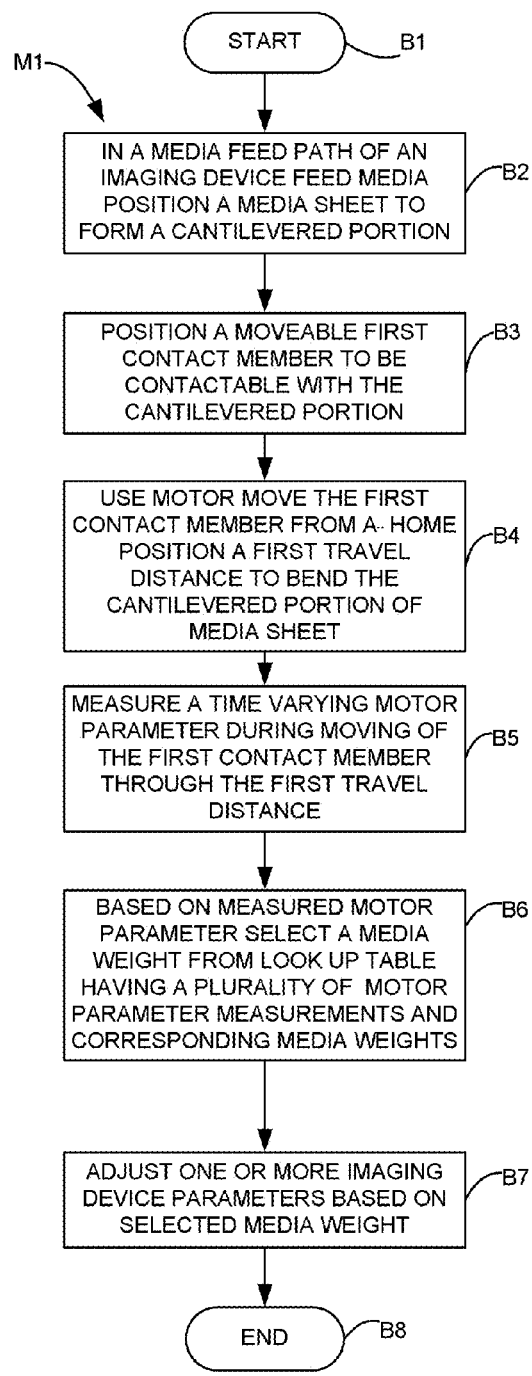
FIG. 16 is a generalized flow chart of a method for determining a media weight.

Referring now to FIG. 16 a block diagram of a method M1 of using the aforementioned media stiffness sensor assemblies for determining a media weight on a media sheet moveable along a media path P in imaging device 2 is illustrated.

Method M1 begins at start block B1. At block B2, a media sheet M is positioned along the media path P of an imaging device 2 to form a cantilevered portion. At block B3, a moveable first contact member 230 is positioned to be contactable with the cantilevered portion of the media sheet M. At block B4, the first contact member is moved using a motor from a home position 231 through a first travel distance to bend the cantilevered portion of media sheet M. At block B5, a time varying parameter of the motor is measured during moving of the first contact member 230 through the first travel distance. At block B6, based on the measured motor parameter, a media weight is selected from a look up table containing a plurality of motor parameter measurements and corresponding media weights. At block B7, one or more parameters of imaging device 2 is adjusted based on the selected media weight. At block B8, method M1 ends.

The time varying motor parameters that are measured may be selected from a motor peak current, a motor root mean square current, a travel energy used to move the first contact member through the travel distance, a rate of change of motor current with respect to displacement of the first contact member, a rate of change of motor current with respect to time of movement of the first contact member through the travel distance, a rate of change of motor voltage respect to displacement of the first contact member, and a rate of change of motor voltage with respect to time of movement of the first contact member through the travel distance.

One way of determining the travel energy for the first contact member 230 comprises: providing a motor, such as motor 221 energized by a power supply using a motor driver, such as motor driver 306-1, having pulse width modulation duty cycle, the motor 221 being operatively coupled to the first contact member 230 for translating the first contact member 230 between the home position thereof and the first travel distance. At each time interval of a plurality of predefined time intervals occurring during moving the first contact member 230 from the home position thereof through the first travel distance, a motor current in motor 221 is measured. A motor voltage is determined by calculating a product of the pulse width modulated duty cycle and a motor supply voltage provided via motor driver 306-1; and an instantaneous input power value to the motor 221 is then calculated as the product of the motor current and the motor voltage. Upon the first contact member 230 reaching the first travel distance, the travel energy is calculated by summing the calculated instantaneous input power value for motor 221 determined for each time interval of the plurality of predefined time intervals that occurred while translating the first contact member 230 from the home position thereof through the first travel distance.

The selected operating parameter of imaging device 2 to be adjusted may be one of: a media speed within the print engine 4, a duplex control scheme, a fuser temperature, a transfer voltage, an output location and a finishing process such as stapling or hole punching. The top speeds of a print engine are designed to support common media weights such as twenty pound media. For thicker/heavier media, the controller 3 would slow the media speed to ensure that the media can be picked, fed and fused. A slower media speed increases the residence time in the fuser 83 providing a higher amount of energy needed to fuse toner to the heavier weight media types. The duplex control scheme may be selected based on media weight where the controller 3 may elect not to send a heavier weight media sheet through a duplex path because turn radii in the duplex path may not be optimized for the heavier media weight types. Fusing temperature is dependent on media thickness. The heavier the media, the more energy is needed to ensure proper fusing of toner to it. If the imaging device 2 cannot maintain a fusing temperature due to the available line voltage, controller 3 may increase fuser temperature and/or reduce media speed to ensure proper fusing as media weight increases. The transfer voltage refers to the voltage needed to transfer the toned image onto the media sheet. For heavier media, a higher transfer voltage may be needed. For a given media weight, the controller 3 can either increase the transfer voltage and/or reduce media speed to ensure proper toner transfer to the media. Media weight may also effect the choice of output location and/or finishing options that would be available in that heavier media may not be able to be sent to a given output location due to small radius turns in the media path or that the number of heavier media sheets may need to be limited as compared to lighter weight media sheets when undergoing stapling and hole punching. When finishing lighter weight media, stapling force and/or hole punch force may be decreased.

Figure 17:
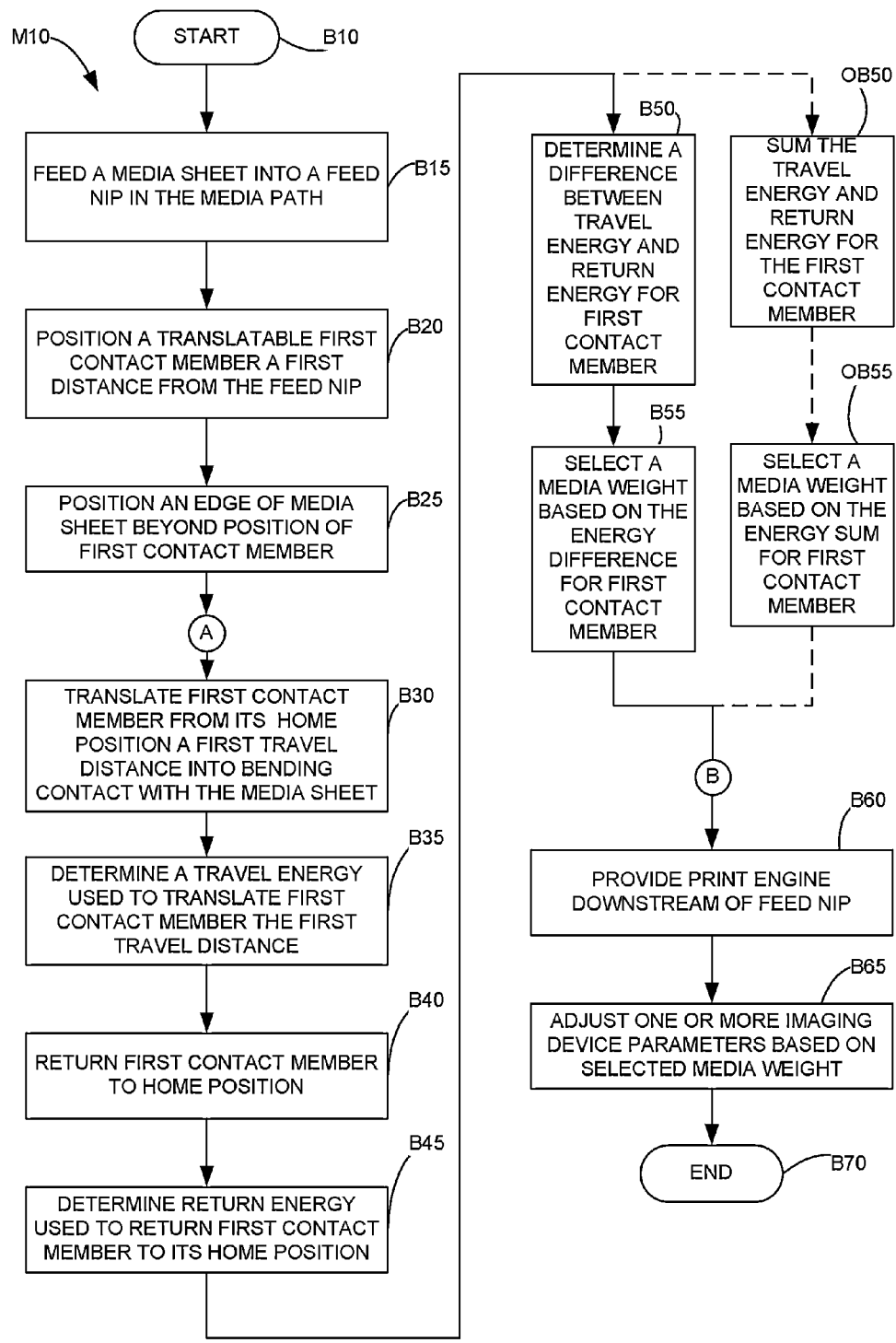
FIG. 17 is a flow chart of another method of determining a media weight in an imaging apparatus.

Referring now to FIG. 17 a block diagram of a method M10 of using the aforementioned media stiffness sensor assemblies for determining a media weight on a media sheet moveable along a media path P in imaging device 2 is illustrated.

Method M10 begins at start block B10. At block B15, a media sheet is fed into feed nip 123. At block B20 a translateable first contact member 230 is positioned at a first distance from the feed nip 123. The first contact member 230 may be operatively coupled to translation mechanism 210 which is operatively coupled to a reversible drive mechanism 220. A position encoder 240 may be operatively coupled to either the drive mechanism 220 or to the translation mechanism 230. Rotating the drive mechanism 220 in a first direction moves the translating mechanism 210 to translate the first contact member 230 from the home position thereof toward the media sheet, and rotating the drive mechanism 220 in a second direction moves the translating mechanism 210 to translate the first contact member 230 to return to the home position thereof. Position encoder 240 provides a signal representative of the position of the first contact member as it moves between the home position thereof through a first travel distance.

At block B25 an edge, as illustrated leading edge LE, of the media sheet M is positioned beyond the position of the first contact member 230 at a second distance from the nip that is greater than the first distance. Next at block B30 the first contact member 230 is translated from a home position thereof through a first travel distance into bending contact with the media sheet M.

At block B35 a travel energy used to translate the first contact member 230 the first travel distance is determined. One way of determining the travel energy for the first contact member 230 comprises: providing a motor, such as motor 221 energized by a power supply using a motor driver, such as motor driver 306-1, having pulse width modulation duty cycle, the motor 221 being operatively coupled to the first contact member 230 for translating the first contact member 230 between the home position thereof and the first travel distance. At each time interval of a plurality of predefined time intervals occurring during translating the first contact member 230 from the home position thereof through the first travel distance, a motor current in motor 221 is measured when translating the first contact member 230 from the home position thereof through the first travel distance. A motor voltage is determined by calculating a product of the pulse width modulated duty cycle and a motor supply voltage provided via motor driver 306-1; and an instantaneous input power value to the motor 221 is then calculated as the product of the motor current and the motor voltage. Upon the first contact member 230 reaching the first travel distance, the travel energy is calculated by summing the calculated instantaneous input power value for motor 221 determined for each time interval of the plurality of predefined time intervals that occurred while translating the first contact member 230 from the home position thereof through the first travel distance.

At block B40 the first contact member 230 is returned to the home position thereof. Next, at block B45, a return energy used to return the first contact member 230 to its home position is determined. The return energy is determined in substantially the same manner as the travel energy was determined. At each time interval of a plurality of predefined time intervals occurring while translating the first contact member 230 through the first travel distance back to its home position, the motor current for motor 221 is measured when translating the first contact member 230 back to the home position; the motor voltage is calculated by calculating the product of the pulse width modulated duty cycle and a motor supply voltage provided via motor driver 306-1; an instantaneous input power value to the motor 221 is determined by calculating the product of the motor current and the estimated motor voltage; and, upon the first contact member 230 returning to its home position, the return energy is calculated by summing the calculated instantaneous input power value determined for each time interval of the plurality of predefined time intervals that occurred while translating the first contact member 230 to return to its home position.

At block B50 an energy difference between the amounts of travel energy and return energy for the first contact member is determined and at block B55, based on the energy difference for the first contact member, a media weight is selected. The selection of the media weight may be done by selecting one media weight class from a plurality of predetermined plurality of media weight classes or selecting one media weight from a predetermined continuum of media weights. Optionally, the total energy used for the travel and return of contact member 230 may also be used. The is shown at optional blocks OB50 and OB55. Proceeding from B45, method M10, at optional block OB50, the travel energy and return energy is summed for the first contact member 230, and, at optional block OB55, based on the energy sum for first contact member 230, a media weight is selected.

A block B60, a print engine 4 is provided downstream of the feed nip and at block B65 at least one operating parameter of the print engine is adjusted based on the select media weight as previously described. Thereafter, at block B70 method M10 ends.

Figure 18:
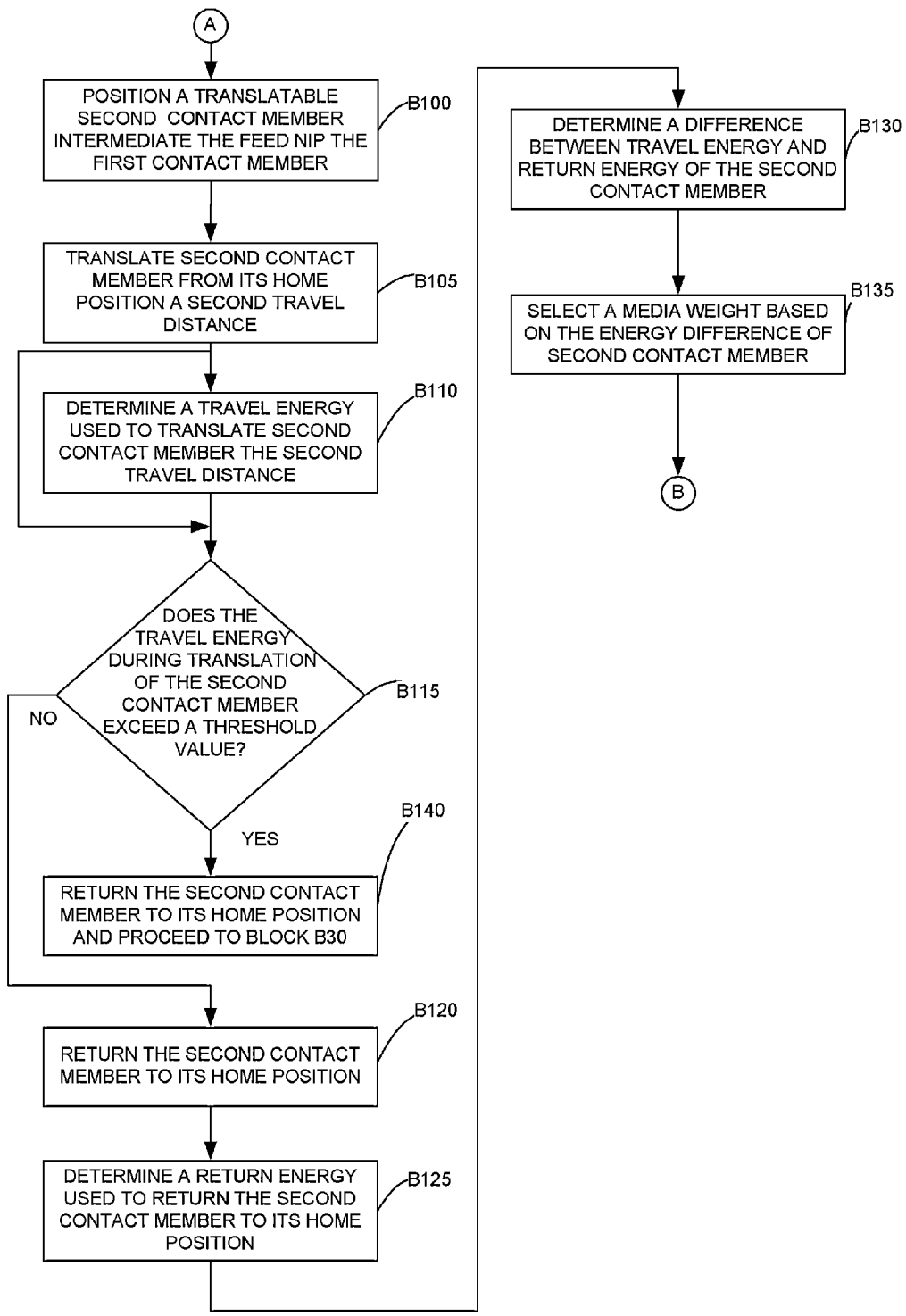
FIG. 18 is a flow chart of a further method of determining a media weight class in an imaging apparatus.

In a further form, method M10 may be modified to include a second contact member 330 that operates in a similar fashion to the first contact member 230. Operation of the second contact member 330 is described with respect to FIG. 18. The use of the second contact member 330 occurs after block B25 at point A of FIG. 17 where method M10 transitions to FIG. 18. At block B100, translateable second contact member 330 is positioned to contact the cantilevered portion of the media sheet intermediate the feed nip 123 and the point at which the first contact member 230 would contact the cantilevered portion. Next, at block B105, second contact member 330 is translated from its home position along a second travel distance toward the media sheet M. The second travel distance may be the same as, longer than, or shorter than the first travel distance. At block B110, a travel energy used to translate the second contact member 330 the second travel distance is determined. Simultaneously therewith at block B115, a determination is made as to whether or not the travel energy being used during translating the second contact member 330 along the second travel distance exceeds a threshold value.

On determining that the threshold value has not been exceeded, method M10 proceeds to block B120 where the second contact member 330 is returned to its home position and, thereafter, at block B125, a return energy used to return second contact member to the home position is determined. At block B130, method M10 determines an energy difference between the amounts of travel energy and return energy for the second contact member 330 and then at block B135 selects, based on the energy difference for the second contact member 330, a media weight. Thereafter, method M10 returns at point B to block B60.

Referring back to block B115 when it is determined that the threshold value has been exceeded, method M10 proceeds to block B140 where the second contact member 330 is returned to its home position and the method M10 then proceeds back to block B30 at point A to cycle first contact member 230 through a measurement cycle.

A second motor 321 energized by a second motor driver 306-2 having a pulse width modulation duty cycle may be used to translate the second contact member 330 and the travel energy and return energy of the second contact member 330 is determined in the same manner as previously described for first contact member 230 and will not be repeated.

On determining that the threshold value has been exceeded, the acts of: translating the first contact member 230 from the home position thereof through first travel distance; determining an amount of travel energy used to translate the first contact member 230; returning first contact member 230 to the home position thereof, determining the amount of return energy for the first contact member 230, determining the energy difference between the amounts of travel energy and return energy for the first contact member 230, and, selecting, based on the energy difference for the first contact member 230, a media class are performed.

Figure 19A:
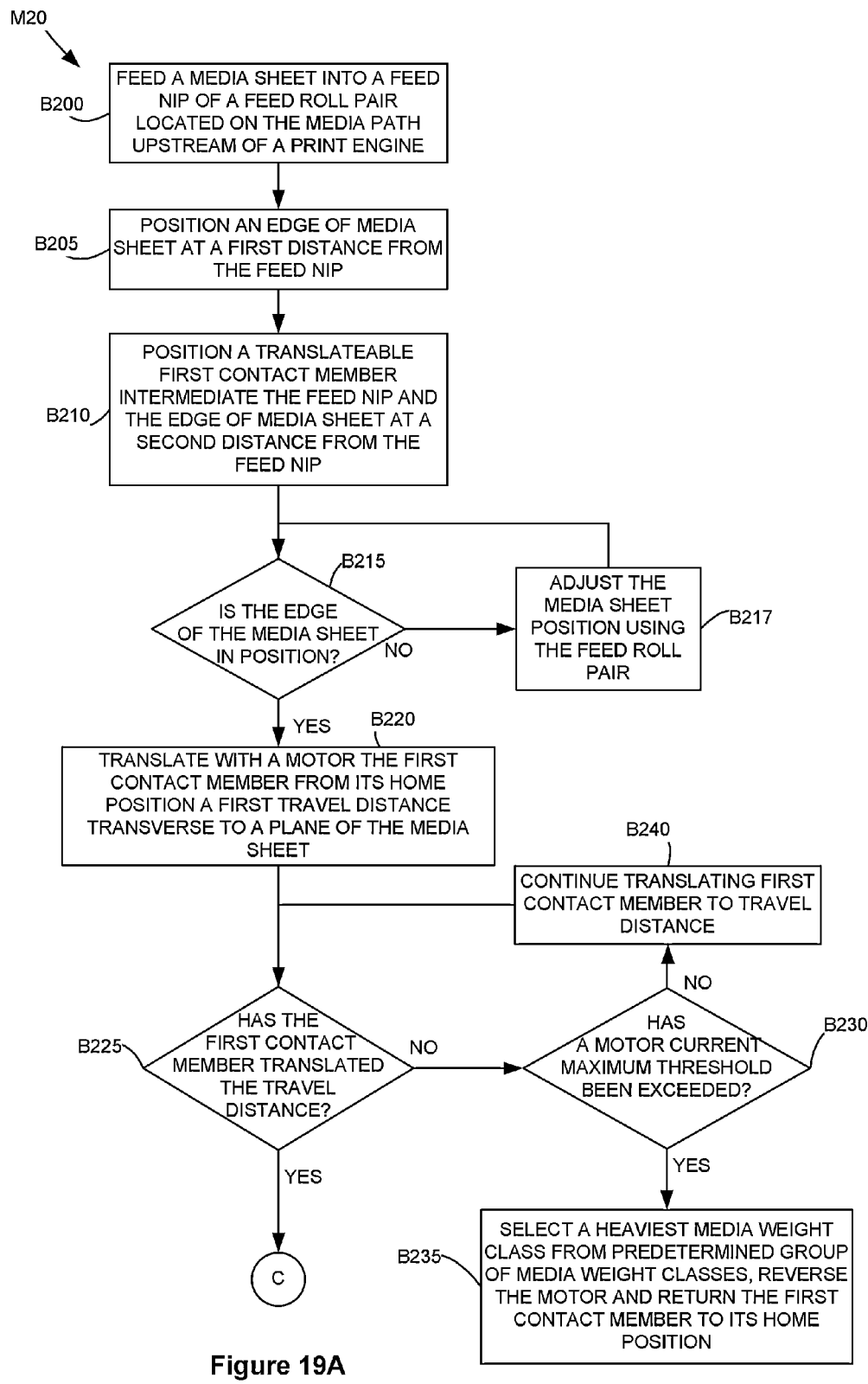
FIGS. 19A-19B illustrate a flow chart of another method of determining a media weight class in an imaging apparatus.
Figure 19B:
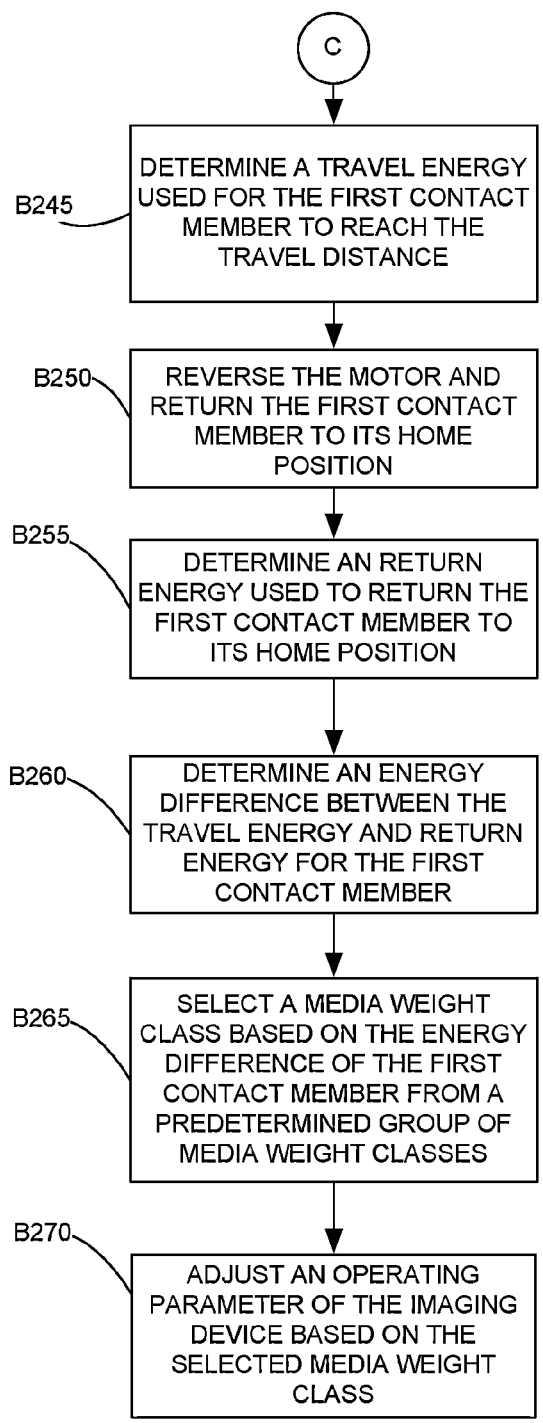

Referring to FIGS. 19A-19B, a further method M20 for determining a media weight is illustrated for imaging device 2 using a print engine 4 to form an image on a media sheet moveable along a media path therein. Method M20 comprises:

feeding, at block B200, a media sheet into a nip formed between a pair of feed rolls positioned along the media path upstream to the print engine;

positioning, at block B205, an edge of the media sheet at a first distance from the nip.

positioning, at block B210, a translateable first contact member 230 intermediate the nip and the edge of the media sheet at a second distance from the nip that is less than the first distance;

determining, at block B215, whether or not the edge of the media sheet is in position; when it is determined that the edge of the media sheet is not in position, adjusting, at block B217 the position of the media sheet until it is in position, this may be accomplished rotating the feed roll pair 121 in either the forward (downstream) or reverse (upstream) direction;

when it is determined that the edge of the media sheet is in position:

then, at block B220, translating along a travel distance, using a reversible motor 221, the first contact member 230 from a home position thereof into contact with the media sheet in a direction transverse to a media plane P of the media sheet;

determining, at block B225, whether or not the first contact member 230 has translated the travel distance;

when it is determined that the first contact member 230 has not translated the travel distance, then determining, at block B230, whether or not a motor current maximum threshold has been exceeded by motor 221;

when it is determined that the motor current maximum threshold has been exceeded, selecting, at block B235 a heaviest media weight class from a predetermined group of media weight classes and reversing the motor 221 and returning the first contact member 230 to the home position thereof; and when it is determined that the motor current maximum threshold has not been exceeded:

continuing, at block B240, translating first contact member 230 to the travel distance;

determining, at block B245, a travel energy used for the first contact member 230 to reach the travel distance;

reversing the motor 221 and returning the first contact member 230 to the home position thereof at block B250;

determining a return energy used to return the first contact member 230 to the home position thereof at block B255;

determining an energy difference between the travel energy and the return energy for the first contact member 230 at block B260;

selecting, at block B265, based on energy difference of the first contact member 230, a media weight class from the predetermined group of media weight classes; and adjusting, at block B270, an operating parameter of the imaging device 2 based in the selected media weight class.

Figure 20A:
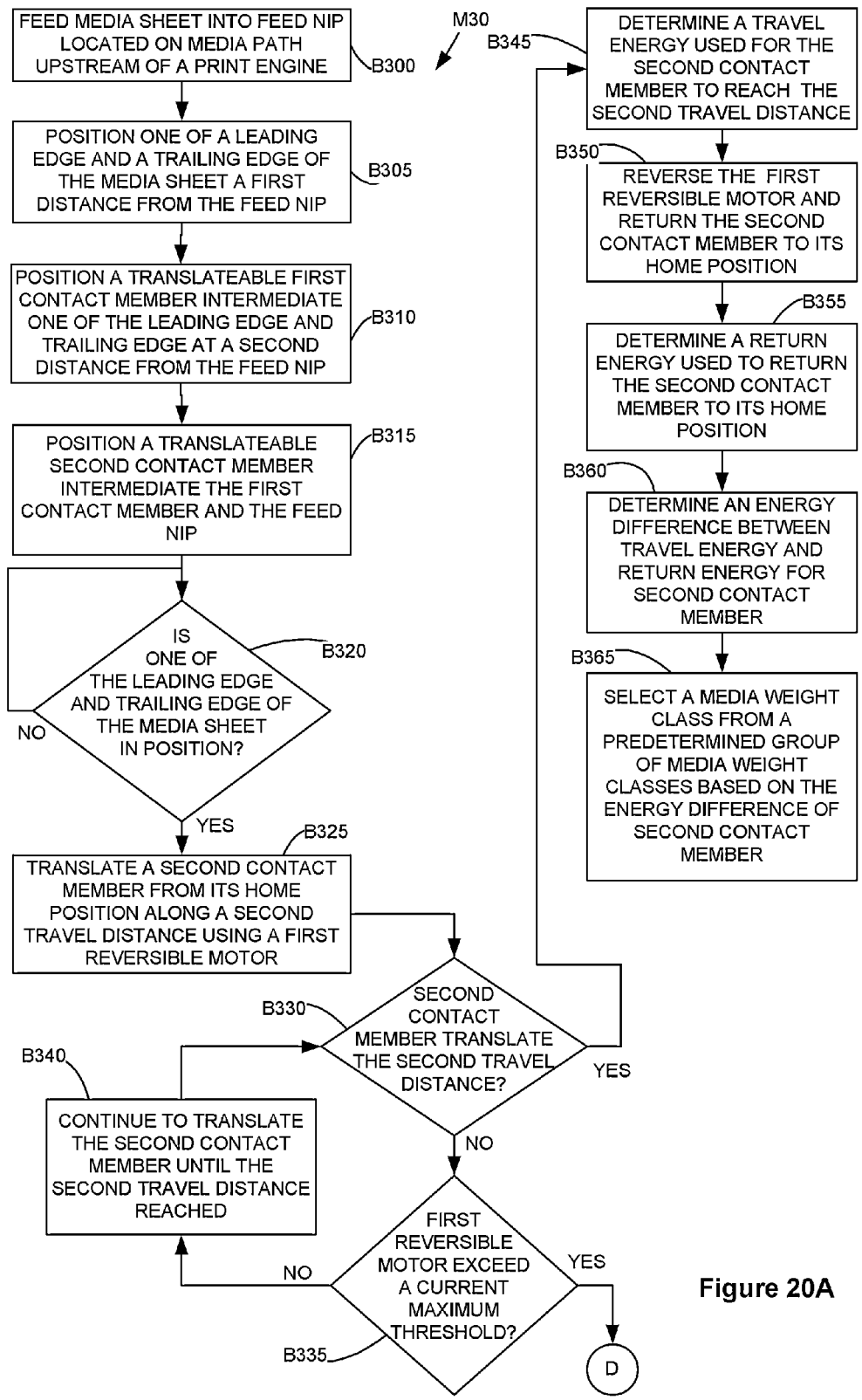
FIGS. 20A-20B illustrate a flow chart of a still further method of determining a media weight class in an imaging apparatus.
Figure 20B:
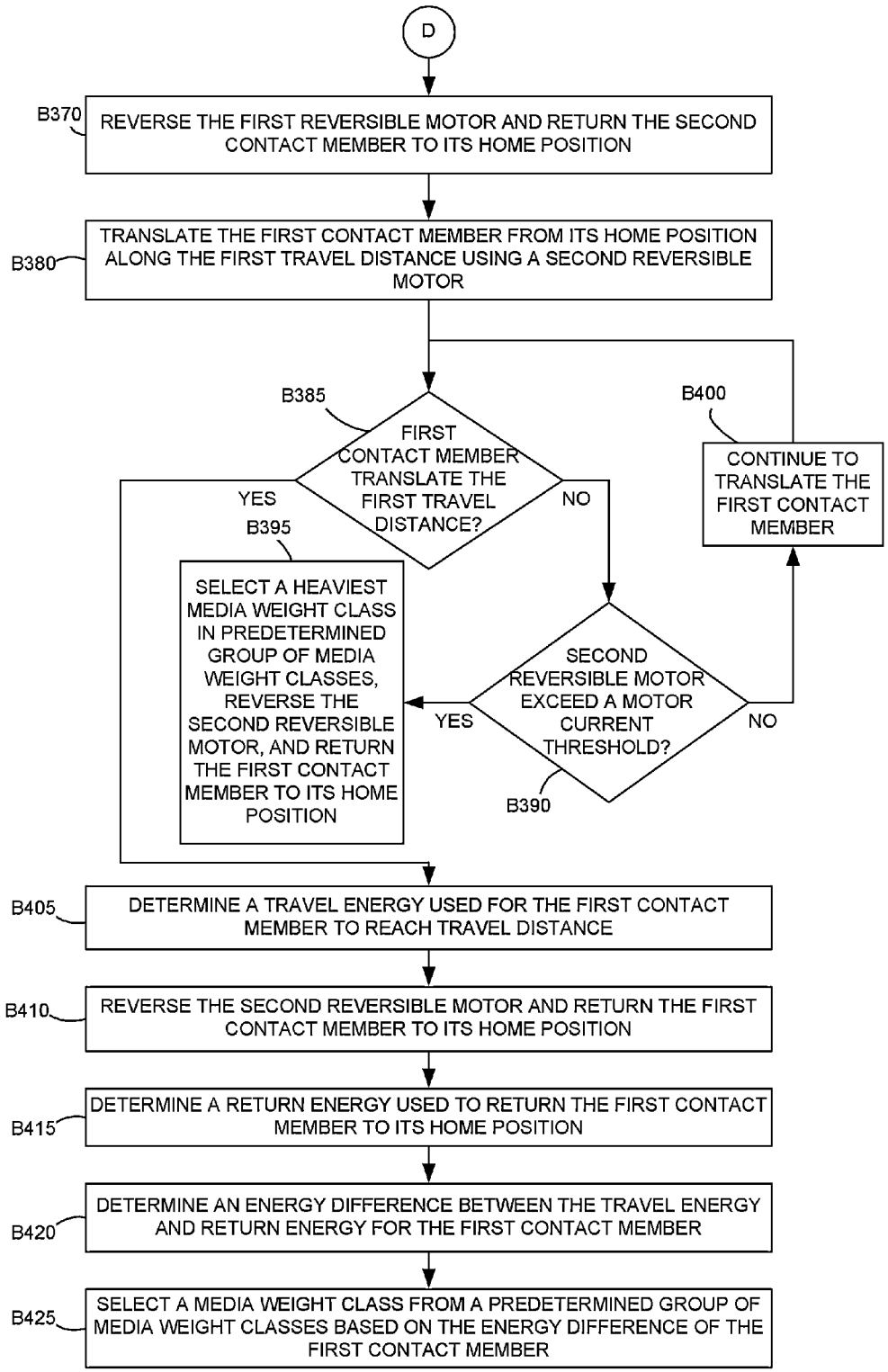

In an imaging device for forming at a print engine therein an image on a media sheet moveable along a media path therein, a method M30 for determining a media weight class is illustrated in FIGS. 20A-20B. Method M30 comprises:

feeding, at block B300, a media sheet into a nip 123 formed between a pair of feed rolls 121 positioned along the media path prior to the print engine;

positioning, at block B305, one of a leading edge and a trailing edge of the media sheet at a first distance from the nip;

positioning, at block B310, a translateable first contact member 230 intermediate one of the leading edge and the trailing edge at a second distance from the nip 123 that is less than the first distance, the first contact member 230 translateable from a home position thereof through to a first travel distance;

positioning, at block B315, a translateable second contact member 330 intermediate the first contact member and the nip 123;

determining, at block B320, whether or not one of the leading edge and trailing edge of the media sheet is in position;

when it is determined that one of the leading edge and trailing edge of the media sheet is in position:

translating, at block B325, using a first reversible motor 321, the second contact member 330 from a home position into contact with the media sheet in a direction transverse to a media plane P of the media sheet along a second travel distance;

determining, at block B330, whether or not the second contact member 330 has translated the second travel distance;

when it is determined that the second contact member 330 has not translated the second travel distance, determining, at block B335, whether or not a motor current maximum threshold for first reversible motor 321 has been exceeded;

when it is determined that the motor current maximum threshold of the first reversible motor 321 has not been exceeded:

continuing, at block B340, translating the second contact member 330 until the second travel distance has been reached;

when, at block B330, it has been determined that the second contact member has reached the second travel distance, then determining, at block B345, a travel energy used for the second contact member 330 to reach the second travel distance;

reversing, at block B350, the first reversible motor 321 and returning the second contact member 330 to the home position thereof;

determining, at block B355, a return energy used to return the second contact member 330 to the home position thereof;

determining, at block B360, an energy difference between the travel energy and the return energy for the second contact member 330; and based on energy difference of the second contact member 330, selecting, at block B365, a media weight class from the predetermined plurality of media weight classes;

when, at block B335 it is determined that the motor current maximum threshold of the first reversible motor 321 has been exceeded, reversing, at block B370, the first reversible motor 321 and returning the second contact member 330 to the home position thereof;

translating, at block B380, the first contact member 230 using a second reversible motor 221 from its home position into contact with the media sheet in a direction transverse to the media plane P along the first travel distance;

determining, at block B385, whether or not the first contact member 230 has translated the first travel distance;

when it is determined that the first contact member 230 has not translated the first travel distance, determining, at block B390, whether or not a motor current maximum threshold for the second reversible motor 221 has been exceeded;

when it is determined that the motor current maximum threshold for the second reversible motor 221 has been exceeded, selecting, at block B395, a heaviest media weight class, reversing the second reversible motor 221 and returning the first contact member 230 to the home position thereof;

when, at block B390, it is determined that the motor current maximum threshold has not been exceeded by the second reversible motor 221, continuing, at block B400, translating first contact member 230 and redetermining whether or not the first contact member 230 has translated the first travel distance, upon determining that the first contact member 230 has traveled the first travel distance, determining, at block B405, a travel energy used for the first contact member 230 to reach the first travel distance;

reversing, at block B410, the second reversible motor 221 and returning the first contact member 230 to the home position thereof;

determining, at block B415, a return energy used to return the first contact member 230 to the home position thereof;

determining, at block B420, an energy difference between the travel energy and the return energy for the first contact member 230; and selecting, at block B425, based on energy difference of the first contact member 230, a media weight class.

With method M30, a print engine, such as print engine 4 may be provided downstream of the nip 123 and upon determination of a media weight class, an operating parameter of the print engine 4 or imaging device 2 may be adjusted as previously described with respect to methods M10 and M20. The motor current threshold for the first and second motors may be the same or can differ. It may be advantageous for the media stiffness assembly being used with the shorter beam length have a lower current threshold value.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

What is claimed is:

1. A media stiffness sensor assembly for use in an imaging device, the media stiffness sensor assembly comprising:
   a frame mountable in the imaging device;
   a translation mechanism translateably mounted to the frame;
   a contact member connected to the translation mechanism and translateable between a home position and a travel distance, the contact member not contacting a media sheet along a media feed path of the imaging device when at the home position, and, the contact member being positioned to provide, when translated along the travel distance, a force component normal to the media feed path of the imaging device;
   a drive mechanism operably connected to the translation mechanism for driving the translation mechanism to translate the contact member from the home position to the travel distance and then back to the home position, the drive mechanism being operably connectable to a controller in the imaging device; and,
   a position sensor providing an output signal indicating the position of the contact member during the translation thereof, the position sensor being operably connectable to the controller.

2. The media stiffness sensor assembly of claim 1 wherein the drive mechanism is mounted on the frame.

3. The media stiffness sensor assembly of claim 2 wherein the drive mechanism includes:
   a reversible motor being operably connectable for communication with the controller wherein rotation of the motor in a first direction translates the contact member from the home position thereof and rotation of the motor in a second direction opposite the first direction translates the contact member toward the home position.

4. The media stiffness sensor assembly of claim 3, wherein the position sensor includes an encoder operably coupled to a drive shaft of the motor and being operably connectable for communication with the controller, the encoder providing the output signal for indicating the position of the contact member.

5. The media stiffness sensor assembly of claim 4, wherein the encoder is a quadrature encoder.

6. The media stiffness sensor assembly of claim 3 wherein the translation mechanism includes a translation member being translateably mounted to the frame, the translation member having a rack portion, and the drive mechanism includes a rack gear, the rack gear being operably coupled to the motor, rotatably mounted to the frame, and engaged with the rack portion of the translation member.

7. The media stiffness sensor assembly of claim 6 wherein the translation member includes two translation members spaced apart on the frame, aligned with one another and coupled to respective ends of the contact member.

8. The media stiffness sensor assembly of claim 1 wherein the contact member is one of a line contact member and a point contact member.

9. The media stiffness sensor assembly of claim 8 wherein the contact member has a cross-sectional shape that is one of rounded, pointed, and flat.

10. An imaging device, comprising:
    a controller;
    a media input tray for retaining a stack of media sheets and a media output area;
    a media feed path extending from the media input tray to the media output area;
    a media picking mechanism adjacent the media input tray for picking a media sheet from the stack of media sheets and feeding the picked media sheet into the media feed path;
    a media feed roll assembly comprising a pair of opposed rolls forming a nip therebetween and operably coupled to a feed roll motor, the media feed roll assembly positioned on the media feed path downstream of the media input tray, receiving the picked media sheet, and feeding the picked media sheet along the media feed path toward a print engine;
    the print engine being positioned adjacent the media feed path, the print engine placing an image onto at least one media sheet being fed along the media feed path;
    a first media stiffness sensor assembly positioned adjacent to the nip, the first media stiffness sensor assembly including a reversible motor operably coupled to a contact member to translate the contact member in a direction to provide a force component transverse to the media feed path, the contact member being translateable from a home position thereof across a plane of the media feed path through a travel distance; and,
    the media picking mechanism, the feed roll motor, the print engine and the first media stiffness sensor assembly being in operable communication with the controller,
    wherein the controller drives the feed roll motor to extend a cantilevered portion of the picked media sheet from the nip, drives the reversible motor to translate the contact member which when translated through a travel distance deflects the cantilevered portion of the picked media sheet, determines an energy amount for a travel energy and a return energy of the contact member, and, based on the energy amount, determines a media weight, the travel energy being an amount of energy used to translate the contact member from the home position thereof through the travel distance and deflect the cantilevered portion of the media sheet, and the return energy being an amount of energy used to return the contact member through the travel distance back to the home position thereof.

11. The imaging device of claim 10 wherein the first media stiffness sensor assembly further includes:
    a frame mounted in the imaging device adjacent to the media feed path;
    a translation mechanism translateably mounted to the frame;
    the contact member connected to the translation mechanism and translateable between the home position and the travel distance;
    a drive mechanism operably connected to the translation mechanism and operably connected to the translation mechanism for translation of the contact member, the drive mechanism including the reversible motor being in operable communication with the controller with the reversible motor being operably connected to the translation mechanism; and, a position sensor providing an output signal to the controller indicating the position of the contact member during the translation thereof, the position sensor being in operable communication with the controller.

12. The imaging device of claim 11 wherein the position sensor includes an encoder operably coupled to a drive shaft of the reversible motor, the encoder operably coupled to the controller and providing the output signal indicating the position of the contact member.

13. The imaging device of claim 12, wherein the encoder is a quadrature encoder.

14. The imaging device of claim 11 wherein the translation mechanism includes a translation member translateably mounted to the frame, the translation member having a rack portion, and the drive mechanism includes a rack gear, the rack gear being operably coupled to the reversible motor, rotatably mounted to the frame, and engaged with the rack portion of the translation member.

15. The imaging device of claim 10 further including a second media stiffness sensor assembly positioned intermediate the nip and the first media stiffness sensor assembly, the second media stiffness sensor assembly being in operable communication with the controller.

16. The imaging device of claim 15 wherein the travel distance of the contact member of the second media stiffness sensor assembly is less than the travel distance of the contact member of the first media stiffness sensor assembly.

17. The imaging device of claim 10 wherein the energy amount is one of the difference between the travel energy and the return energy and the sum of the travel energy and the return energy.

18. An imaging device, comprising:
a controller;
a media input tray for retaining a stack of media sheets and a media output area;
a media feed path extending from the media input tray to the media output area;
a media picking mechanism adjacent the media input tray for picking a media sheet from the stack of media sheets and feeding the picked media sheet into the media feed path;
a media feed roll assembly comprising a pair of opposed rolls forming a nip therebetween and operably coupled to a feed roll motor, the media feed roll assembly positioned on the media feed path downstream of the media input tray, receiving the picked media sheet, and feeding the picked media sheet along the media feed path toward a print engine;
the print engine positioned adjacent the media feed path, the print engine placing an image onto at least one media sheet being fed along the media feed path;
a first media stiffness sensor assembly positioned adjacent to the nip;
a second media stiffness sensor assembly positioned intermediate the nip and the first media stiffness sensor assembly, each of the first and second media stiffness sensor assemblies including:

a frame mounted in the imaging device adjacent to the media feed path;
a translation mechanism translateably mounted to the frame;
a contact member connected to the translation mechanism and translateable between a home position thereof and a travel distance, the contact member being positioned to provide, when translated, a force component normal to the media feed path;
a drive mechanism operably connected to the translation mechanism and operably connected to the translation mechanism for translation of the contact member, the drive mechanism including a reversible motor being operably connected to the translation mechanism;
a position sensor providing an output signal to the controller indicating the position of the contact member during the translation thereof; and,
a reversible motor operably coupled to the translation mechanism for translating the contact member from a home position thereof across a plane of the media feed path through a travel distance;
and,
the media picking mechanism, the feed roll motor, the print engine and the first and second media stiffness sensor assembly being in operable communication with the controller,
wherein the controller drives the feed roll motor to extend a cantilevered portion of the picked media sheet from the nip, drives one of the first and second media stiffness sensor assemblies to translate the respective contact member which when translated through a respective travel distance deflects the cantilever portion of the picked media sheet, determines an energy amount for a travel energy and a return energy of the respective translated contact member, and, based on the energy amount, determines a media weight, the travel energy being an amount of energy used to translate the contact member of the respective driven media stiffness sensor assembly from the home position thereof through the travel distance and deflect the cantilevered portion of the media sheet, and the return energy being an amount of energy used to return the contact member of the respective driven media stiffness sensor assembly through the travel distance back to the home position thereof.

19. The imaging device of claim 18 wherein the travel distance of the contact member of the second media stiffness sensor assembly is less than the travel distance of the contact member of the first media stiffness sensor assembly.

20. The imaging device of claim 18 wherein the contact member of the first and second media stiffness sensor assemblies is one of a line contact member and a point contact member.

21. The imaging device of claim 18 wherein the contact member of the first and second media stiffness is positioned transverse to the media feed path.

* * * * *